(12) United States Patent
Volk

(10) Patent No.: US 7,735,998 B2
(45) Date of Patent: *Jun. 15, 2010

(54) MULTI-LAYERED MULTIFOCAL LENS WITH BLENDED REFRACTIVE INDEX

(76) Inventor: Donald A. Volk, 3872 Owens St., Honolulu, HI (US) 96815

( * ) Notice: Subject to any disclaimer, the term of this patent is extended or adjusted under 35 U.S.C. 154(b) by 0 days.

This patent is subject to a terminal disclaimer.

(21) Appl. No.: 11/977,362

(22) Filed: Oct. 24, 2007

(65) Prior Publication Data

US 2008/0123049 A1 May 29, 2008

Related U.S. Application Data

(60) Provisional application No. 60/854,467, filed on Oct. 25, 2006.

(51) Int. Cl.
G02C 7/05 (2006.01)
G02B 3/00 (2006.01)

(52) U.S. Cl. ......... 351/171; 351/161; 351/168; 351/172; 359/652

(58) Field of Classification Search ......... 359/652–654; 351/159, 160 R, 161, 168, 169, 171, 172
See application file for complete search history.

(56) References Cited

U.S. PATENT DOCUMENTS

| | | |
|---|---|---|
| 3,485,556 A | 12/1969 | Naujokas |
| 3,486,808 A | 12/1969 | Hamblen |
| 3,542,535 A | 11/1970 | Hensler, et al. |
| 3,563,057 A | 2/1971 | Rosenbauer |
| 3,729,253 A | 4/1973 | Moore et al. |
| 3,904,281 A | 9/1975 | Jampolsky |
| 4,022,855 A | 5/1977 | Hamblen |
| 4,070,105 A | 1/1978 | Marzouk |
| 4,073,579 A | 2/1978 | Deeg et al. |
| 4,146,306 A | 3/1979 | Wallach |
| 4,210,391 A | 7/1980 | Cohen |
| 4,340,283 A | 7/1982 | Cohen |

(Continued)

FOREIGN PATENT DOCUMENTS

WO WO 86/06846 11/1986

(Continued)

OTHER PUBLICATIONS

Darryl J. Collins, Official Action, Notification date of Aug. 28, 2009, U.S. Appl. No. 11/977,353, Titled: Multi-layered Gradient Index Progressive Lens, Filed: Oct. 24, 2007, Inventor: Donald A. Volk, 5 pages.

(Continued)

*Primary Examiner*—Darryl J Collins

(57) ABSTRACT

The lens of the present invention relates to multifocal spectacle lenses, including bifocal and trifocal lenses, with improved cosmetic appearance, optical performance and wide visual field. The lens comprises a plurality of axially layered and bonded lens sections of continuous curvature at least one of which has a changing refractive index incorporating a refractive index blend area oriented transverse to a meridian of the lens. The blend eliminates visibility of the joining area of adjacent portions of generally constant refractive index and the abrupt magnification shift and image jump typical of segmented multifocal lenses. The areas of generally constant refractive index provide the refractive powers for corresponding discrete vision portions of the lens. The other layer(s) of the lens incorporates a constant or similarly changing refractive index.

13 Claims, 13 Drawing Sheets

U.S. PATENT DOCUMENTS

| | | | |
|---|---|---|---|
| 4,422,733 | A | 12/1983 | Kikuchi et al. |
| 4,645,523 | A | 2/1987 | Howard et al. |
| 4,666,236 | A | 5/1987 | Mikami et al. |
| 4,810,070 | A | 3/1989 | Suda et al. |
| 4,824,227 | A | 4/1989 | Goldenberg et al. |
| 4,898,461 | A | 2/1990 | Portney |
| 4,944,584 | A | 7/1990 | Maeda et al. |
| 4,950,057 | A | 8/1990 | Shirayanagi |
| 5,042,936 | A | 8/1991 | Guilino et al. |
| 5,061,058 | A | 10/1991 | Guilino et al. |
| 5,080,472 | A | 1/1992 | Gupta |
| 5,095,079 | A | 3/1992 | Yean et al. |
| 5,100,589 | A | 3/1992 | Ticknor |
| 5,148,205 | A | 9/1992 | Guilino et al. |
| 5,229,797 | A | 7/1993 | Futhey et al. |
| 5,258,144 | A | 11/1993 | Yean et al. |
| 5,386,312 | A | 1/1995 | Spencer |
| 5,541,774 | A | 7/1996 | Blankenbecler |
| 5,617,252 | A | 4/1997 | Manhart et al. |
| 5,779,751 | A | 7/1998 | Wong |
| 5,847,803 | A | 12/1998 | Gupta et al. |
| 5,861,934 | A | 1/1999 | Blum et al. |
| 5,907,386 | A | 5/1999 | Gupta et al. |
| 5,917,105 | A | 6/1999 | Xu et al. |
| 5,982,543 | A | 11/1999 | Fiala |
| 5,982,545 | A | 11/1999 | Su |
| 5,998,096 | A | 12/1999 | Umemoto et al. |
| 6,027,672 | A | 2/2000 | Weitzel et al. |
| 6,081,632 | A | 6/2000 | Yoshimura et al. |
| 6,089,711 | A | 7/2000 | Blankenbecler et al. |
| 6,220,705 | B1 | 4/2001 | Francois et al. |
| 6,240,226 | B1 | 5/2001 | Presby et al. |
| 6,319,433 | B1 | 11/2001 | Kohan |
| 6,709,107 | B2 | 3/2004 | Jiang et al. |
| 6,712,466 | B2 | 3/2004 | Dreher |
| 6,813,082 | B2 | 11/2004 | Bruns |
| 6,836,371 | B2 | 12/2004 | Lai et al. |
| 6,840,619 | B2 | 1/2005 | Dreher |
| 6,934,088 | B2 | 8/2005 | Lai et al. |
| 6,942,339 | B2 | 9/2005 | Dreher |
| 6,951,391 | B2 | 10/2005 | Morris et al. |
| 6,976,641 | B2 | 12/2005 | Lai et al. |
| 6,989,938 | B2 | 1/2006 | Bruns |
| 7,002,754 | B2 | 2/2006 | Baer et al. |
| 7,025,456 | B2 | 4/2006 | Morris et al. |
| 7,093,938 | B2 | 8/2006 | Morris et al. |
| 7,156,516 | B2 | 1/2007 | Morris et al. |
| 7,217,375 | B2 | 5/2007 | Lai |
| 7,232,218 | B2 | 6/2007 | Morris et al. |
| 7,249,847 | B2 | 7/2007 | Dreher |
| 7,293,871 | B2 | 11/2007 | Dreher et al. |
| 7,371,804 | B2 | 5/2008 | Jethmalani et al. |
| 7,377,640 | B2 | 5/2008 | Piers et al. |
| 7,420,743 | B2 | 9/2008 | Lai et al. |
| 7,455,404 | B2 | 11/2008 | Bandhauer et al. |
| 7,473,378 | B2 | 1/2009 | Li et al. |
| 2002/0080464 | A1 | 6/2002 | Bruns |
| 2004/0051846 | A1 | 3/2004 | Blum et al. |
| 2008/0123048 | A1 | 5/2008 | Volk |

FOREIGN PATENT DOCUMENTS

| | | |
|---|---|---|
| WO | WO 97/10527 | 3/1997 |
| WO | WO 99/13361 | 3/1999 |
| WO | WO 2006/036762 | 4/2006 |
| WO | WO 2008/051592 | 5/2008 |

OTHER PUBLICATIONS

David Joel Fischer, Gradient-Index Ophthalmic Lens Design and Polymer Material Studies, Ph.D Thesis UNiversity of Rochester, 2002.

Blaine R. Copenheaver, International Search Report and Written Opinion for application PCT/US2007/022574, Apr. 30, 2008, 8 pages.

Lee W. Young, International Search Report and Written Opinion for application PCT/US2007/022615, May 13, 2008, 7 pages.

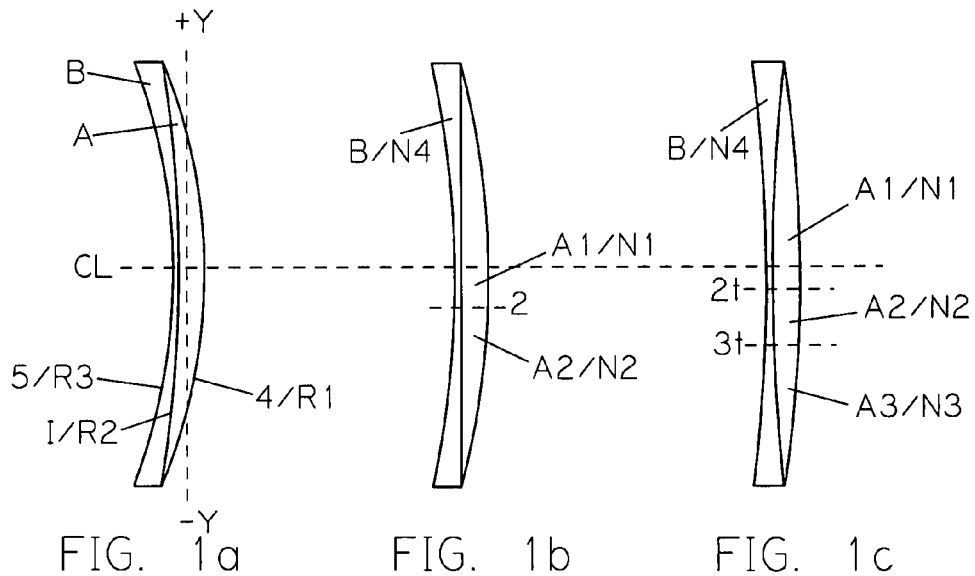
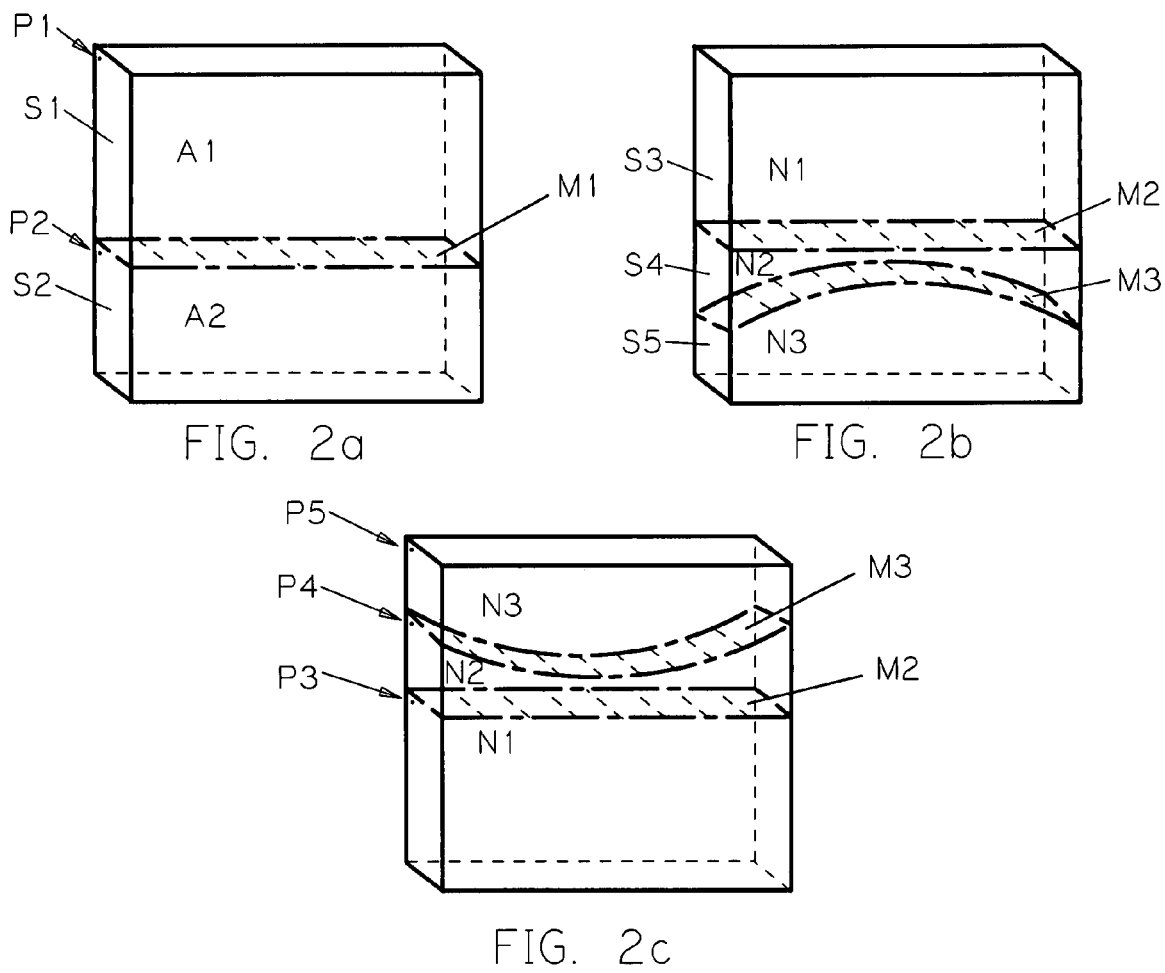

| Lens | R1-convex Anterior | R2-internal Interface | R3-concave Posterior | Center T CT mm | Edge T ET mm | Sphere CREN | Conic CC constant | Best fit sphere CREN |
|---|---|---|---|---|---|---|---|---|
| #1 | 65.9163 | -200 | -75.3848 | 3.38 | 2.78 | 18.436 | -.018 (a) | 18.426 |
| #2 | 78.3036 | -400 | -92.7272 | 3.35 | 2.74 | 18.555 | -.243 (a) | 18.482 |
| #3 | 86.4914 | -800 | -104.8111 | 3.34 | 2.72 | 18.603 | -.485 (a) | 18.496 |
| #4 | 96.6458 | plano | -120.5435 | 3.33 | 2.71 | 18.643 | -.918 (a) | 18.499 |
| #5 | 109.5707 | 800 | -141.8702 | 3.32 | 2.70 | 18.675 | -1.733 (a) | 18.491 |
| #6 | 126.5772 | 400 | -172.4195 | 3.32 | 2.70 | 18.700 | -3.338 (a) | 18.474 |
| #7 | 184.1299 | 200 | -303.349 | 3.32 | 2.70 | 18.727 | -14.879 (a) | 18.419 |

Arrows labeled: "Approximate maximum RID of 1st section" and "Approximate maximum RID of lens"

| Refractive Index Difference (RID) | 1 | 1.5 | 2.0 | 2.5 | 3.0 | 3.5 |
|---|---|---|---|---|---|---|
| 0 | 46.69 – 50.01 | ------- | ------- | ------- | ------- | ------- |
|  | 30.92 – 32.83 | 45.84 – 49.12 | ------- | ------- | ------- | ------- |
|  | 23.31 – 24.64 | 34.70 – 36.93 | 45.85 – 49.46 | ------- | ------- | ------- |
| .1 | 18.36 – 19.36 | 27.39 – 29.03 | 36.28 – 38.86 | ------- | ------- | ------- |
|  | 15.33 – 16.14 | 22.89 – 24.20 | 30.37 – 32.38 | 45.01 – 48.57 | 45.02 – 48.59 | ------- |
|  | 12.91 – 13.58 | 19.30 – 20.37 | 25.63 – 27.23 | 37.75 – 40.49 | 38.07 – 40.89 | 44.17 – 47.70 |
|  | 11.31 – 11.88 | 16.91 – 17.82 | 21.85 – 23.82 | 31.89 – 34.06 | 33.45 – 35.78 | 38.85 – 41.76 |
| .2 | 9.87 – 10.36 | 14.77 – 15.55 | 19.63 – 20.77 | 27.98 – 29.80 | 29.25 – 31.20 | 34.00 – 36.42 |
|  | 8.89 – 9.33 | 13.30 – 13.99 | 17.69 – 18.69 | 24.46 – 25.98 | 26.38 – 28.08 | 30.68 – 32.77 |
|  | 7.93 – 8.32 | 11.87 – 12.48 | 15.79 – 16.66 | 22.05 – 23.38 | 23.56 – 25.03 | 27.41 – 29.22 |
|  | 7.27 – 7.62 | 10.89 – 11.44 | 14.49 – 15.27 | 19.69 – 20.84 | 21.63 – 22.94 | 25.17 – 26.78 |
| .3 | 6.59 – 6.30 | 9.86 – 10.36 | 13.12 – 13.82 | 18.07 – 19.10 | 19.60 – 20.76 | 22.82 – 24.24 |
|  | 6.12 – 6.41 | 9.16 – 9.62 | 12.19 – 12.83 | 16.37 – 17.29 | 18.22 – 19.27 | 21.21 – 22.5 |
|  | 5.60 – 5.86 | 8.38 – 8.80 | 11.16 – 11.74 | 15.21 – 16.05 | 16.68 – 17.63 | 19.42 – 20.58 |
|  | 5.25 – 5.50 | 7.86 – 8.25 | 10.47 – 11.00 | 13.93 – 14.68 | 15.65 – 16.53 | 18.22 – 19.29 |
| .4 | 5.02 – 5.26* | 7.53 – 7.89 | 10.02 – 10.52 | 13.06 – 13.76 | 14.99 – 15.81 | 17.46 – 18.46 |
|  | 4.76 – 4.98 | 7.14 – 7.48 | 9.50 – 9.97 | 12.51 – 13.16 | 14.22 – 14.98 | 16.57 – 17.49 |
|  | 4.58 – 4.79 | 6.86 – 7.19 | 9.14 – 9.58 | 11.86 – 12.47 | 13.68 – 14.40 | 15.94 – 16.81 |
|  | 4.37 – 4.57 | 6.55 – 6.86 | 8.73 – 9.15 | 11.41 – 11.99 | 13.07 – 13.74 | 15.23 – 16.04 |
| .5 | 4.22 – 4.41 | 6.33 – 6.62 | 8.43 – 8.83 | 10.90 – 11.44 | 12.62 – 13.26 | 14.71 – 15.48 |
|  | 4.05 – 4.24 | 6.07 – 6.36 | 8.09 – 8.48 | 10.52 – 11.04 | 12.12 – 12.73 | 14.13 – 14.86 |
|  | 3.93 – 4.10 | 5.88 – 6.15 | 7.84 – 8.20 | 10.11 – 10.60 | 11.74 – 12.32 | 13.69 – 14.39 |
|  | 3.79 – 3.96 | 5.68 – 5.94 | 7.56 – 7.91 | 9.79 – 10.26 | 11.33 – 11.89 | 13.21 – 13.88 |
|  | 3.68 – 3.84 | 5.51 – 5.76 | 7.34 – 7.68 | 9.45 – 9.90 | 11.00 – 11.54 | 12.83 – 13.47 |
| .6 | 3.56 – 3.72 | 5.34 – 5.58 | 7.11 – 7.44 | 9.17 – 9.61 | 10.56 – 11.17 | 12.43 – 13.05 |
|  | 3.47 – 3.62 | 5.20 – 5.43 | 6.92 – 7.24 | 8.89 – 9.31 | 10.37 – 10.87 | 12.10 – 12.69 |
|  | 3.37 – 3.52 | 4.94 – 5.28 | 6.73 – 7.03 | 8.65 – 9.05 | 10.08 – 10.56 | 11.76 – 12.33 |
|  | 3.28 – 3.43 | 4.92 – 5.14 | 6.56 – 6.86 | 8.41 – 8.80 | 9.83 – 10.30 | 11.46 – 12.02 |
|  | 3.20 – 3.34 | 4.80 – 5.01 | 6.39 – 6.68 | 8.20 – 8.57 | 9.58 – 10.03 | 11.17 – 11.71 |
|  | 3.13 – 3.26 | 4.69 – 4.90 | 6.24 – 6.52 | 7.99 – 8.36 | 9.36 – 9.80 | 10.91 – 11.44 |
|  | 3.05 – 3.19 | 4.58 – 4.78 | 6.10 – 6.37 | 7.62 – 7.97 | 9.14 – 9.57 | 10.66 – 11.17 |

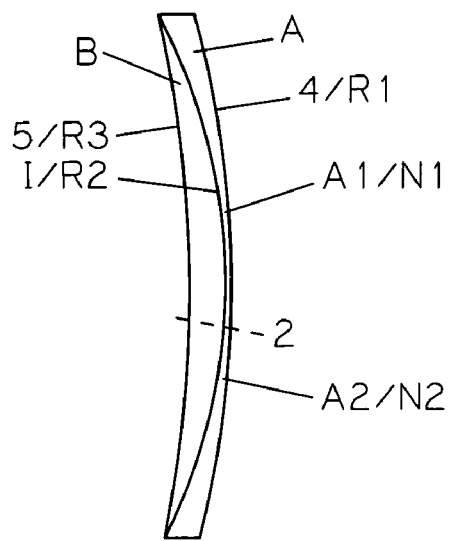
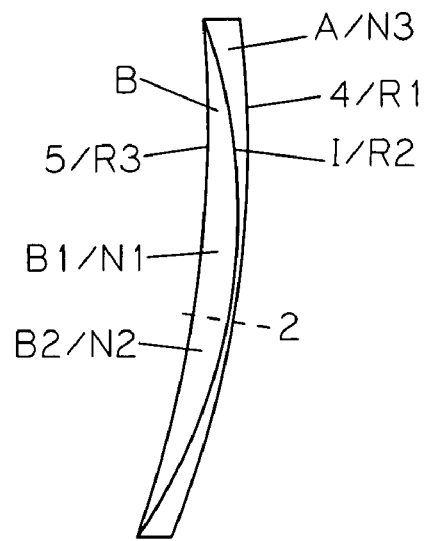
FIG. 8    FIG. 9
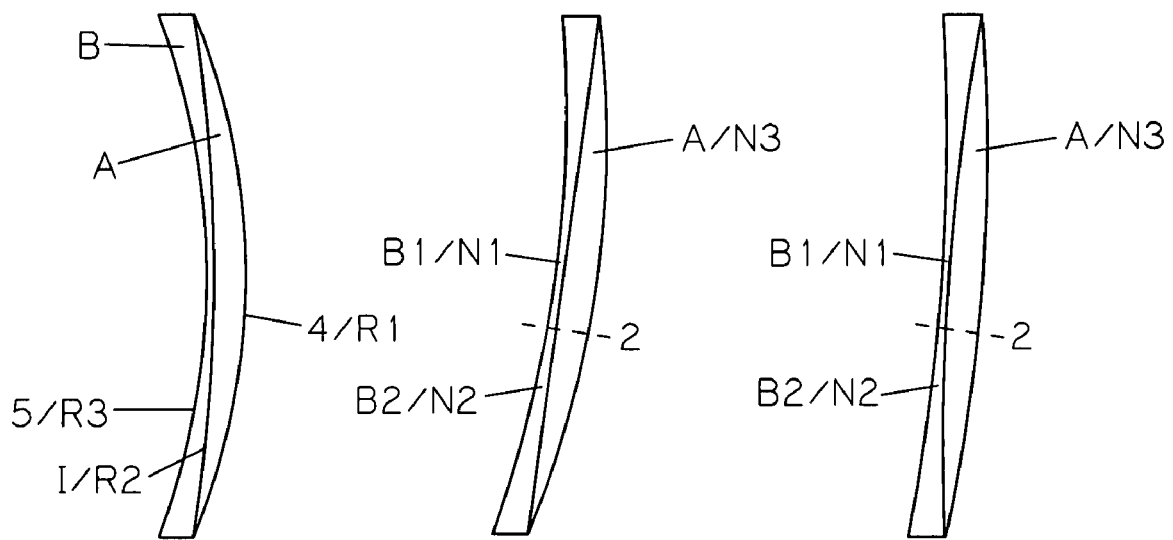
FIG. 10a    FIG. 10b    FIG. 10c

MULTI-LAYERED MULTIFOCAL LENS WITH BLENDED REFRACTIVE INDEX

This application claims the benefit of U.S. Provisional application 60/854,467 filed Oct. 25, 2006.

FIELD OF THE INVENTION

The lens of the present invention relates to multifocal spectacle lenses, including bifocal and trifocal lenses, with improved cosmetic appearance, optical performance and wide visual field. The lens comprises a plurality of axially layered and bonded lens sections of continuous curvature at least one of which has a changing refractive index incorporating a refractive index blend area oriented transverse to a meridian of the lens. The blend eliminates visibility of the joining area of adjacent portions of generally constant refractive index and the abrupt magnification shift and image jump typical of segmented multifocal lenses. The areas of generally constant refractive index provide the refractive powers for corresponding discrete vision portions of the lens. The other layer(s) of the lens incorporates a constant or similarly changing refractive index.

BACKGROUND OF THE INVENTION

Multifocal spectacle lenses are visual aids used in the management of presbyopia, the condition wherein the accommodative function of the eye is partially or fully lost. The Vision Council of America defines a multifocal as a 'lens designed to provide correction for two or more discrete distances'. As such Bifocal and trifocal lenses are multifocal lenses and are distinguished from a progressive addition lens, which is 'designed to provide correction for more than one viewing distance in which the power changes continuously rather than discretely'. The first multifocal lens was the original bifocal lens invented by Benjamin Franklin in 1784. Trifocal lenses were later introduced by John Hawkins in 1826. A bifocal lens typically has one power correction for distance vision and one for near vision, while a trifocal lens typically has one power for distance vision, one for intermediate vision and one for near vision, although there are exceptions to this. Some multifocal lenses are task specific and have a refractive power other than that for distance vision in the upper portion of the lens, or are reversed, with the add power segment in the upper portion and distance vision correction in the lower portion. A quadrafocal lens may take the form of trifocal lens with an added top bifocal segment. Similarly, a 'double D' bifocal lens has a $2^{nd}$ bifocal segment in the upper portion of the lens.

Bifocal segments can have one of several shapes variously termed flat top, curved top, round, rectangular, and 'Executive'. Trifocals are commonly available in flat top and 'Executive' styles. Like bifocals, trifocals segments are available in many sizes and heights. A flat top design is the most common type of bifocal. Segment sizes range from 25 through 40 mm with 28 mm being the most common segment. The curved top bifocal lens is similar to the flat top in general shape, but the top of the segment is curved. The round segment of the 'Kryptok' bifocal lens is less noticeable than the curved top bifocal segment. The near vision portion of an 'Executive' bifocal lens comprises the entire bottom section of the spectacle lens, providing the largest reading area of all bifocal lenses. In this respect it is most like the original Benjamin Franklin bifocal lens, and is most useful for extended near work requiring a large visual field. Less common today is the Ultex design wherein the segment has a curved upper portion but otherwise comprises the entire bottom section of the spectacle lens like the 'Executive' bifocal. Segment tops are generally but not always positioned at or a few millimeters below the lower lid margin, with round segments decentered nasally 2 to 3 mm to allow for convergence.

The majority of bifocal lenses produced today are one piece plastic lenses with the 'add' portion integrally formed into the body of the lens. Due to the discontinuous nature of the surface contour where the two sections meet, the segment is visible within the lens and the patient may perceive image jump or image displacement when looking at an object through the different power zones of the lens. Often times there is a noticeable ridge with segments that have a flat top. Fused glass bifocal and trifocal lenses are less common now than years ago. These lenses utilize two compatible glasses with different refractive indices that are fused together at over 600° c. The higher refractive index segment of the fused glass lens as well is visible within the lens and image jump is also present.

No-line or blended bifocals attempt to hide segment visibility by blending the area that joins the different sections of the lens. Blended bifocal lenses have not gained great popularity as the blend area incorporates a curvature inflection or deformation that exhibits blur and distortion.

In addition to bifocal and trifocal lenses, progressive addition lenses are used to provide correction for more than one viewing distance. Unlike bifocal and trifocal lenses, a progressive lens has a gradient of increasing lens power that provides a continuous range of focus between near and far distances. The extent of the power gradient typically ranges from around 12 to 18 mm. Progressive lenses have cosmetic appeal as the segment line and visibility present in bifocal and trifocal lenses is absent, but the useful area of the progressive and near vision zones of the lens is restricted as aberrations resulting from the power change of the lens result in poor vision especially in the lower lateral portions of the lens. As a result, some individuals do not adjust well to progressive lenses and prefer either reading glasses or bifocal or trifocal spectacle lenses.

Prior to the advent of plastic progressive lenses and blended bifocals, designers attempted to develop multifocal lenses with refractive index gradients between viewing portions of the lens to hide the segment line by locally modifying the refractive index at the interface of the segment and carrier lens. Ion exchange methods for segmented glass lenses have been suggested for this purpose, as described in U.S. Pat. No. 3,542,535 to Hensler, for example. The use of inorganic salts to modify the refractive index of a porous glass to create an ophthalmic lens with localized areas of power change has also been suggested. U.S. Pat. No. 4,073,579 to Deeg, et al describes such a lens. None of the lens systems has ever found commercial success, due in part to the difficulty involved in their respective manufacturing processes and the relatively small amount of refractive index change induced. Although some of these methods may be useful for the correction of optical aberrations, a greater amount of refractive index change is required to provide the refractive power needed for the high diopter additions of bifocal and trifocal lenses.

Gradient index plastic lenses produced by diffusion or other methods have been suggested.

U.S. Pat. No. 5,861,934 to Blum et al and U.S. Pat. No. 4,944,584 Maeda et al describe a multifocal lens having a gradient index resin layer between a first resin layer and the second resin layer. The inner portion has a curved segment-like region that provides add power. The refractive index gradient ranges between that of the first layer to that of the second layer in an axial direction and therefore makes the transition between the first and second layers less abrupt and thus makes the finished multifocal zone more invisible. Both of these lenses will exhibit a localized area of plus power and its associated optical properties and aberrations.

U.S. Pat. No. 3,485,556 to Naujokas describes a plastic multifocal lens with a uniform refractive index gradient between upper and lower lens portions of different refractive index. This lens at first appears to be capable of providing the stated distance and near vision properties. A ray tracing of the lens in accordance with the parameters set forth in the patent shows that only when a significantly high plus power configuration is utilized can an add power of even 1 diopter be achieved. Using the refractive indices of 1.5 and 1.6 identified in the patent a calculated plus power of 4.714 diopters is needed in the distance vision portion to achieve the only slightly greater power of 5.714 diopters in the near vision portion, thus the lens is useful only to those needing high plus power correction for distance vision. Furthermore, if a prescription incorporating cylinder power is produced on either the front or back surface, the cylinder power will vary and cause aberrations as a result of the gradually or progressively varying refractive index.

U.S. Pat. No. 6,942,339 to Dreher describes a multifocal or progressive lens constructed with a layer of variable index material, such as epoxy, sandwiched in between two lens blanks. The inner epoxy coating aberrator has vision zones configured to correct aberrations of the patient's eye and higher order aberrations. The variable index coating that comprises the inner layer of this lens does not provide the progressive add power of the lens, rather as stated in the patent it corrects for aberrations of the patient's eye. The lens has many of the limitations typical of aspheric progressive lenses.

SUMMARY

Based on the foregoing, there is found to be a need to provide a multifocal spectacle lens that avoids the problems associated with the prior art lenses and which in particular has improved optical attributes. The benefits are derived from a multi-layered lens incorporating a refractive index change that provides the required powers for different distance viewing portions. It is therefore a main object of the present invention to provide a multi-layered multifocal lens that comprises at least one layer incorporating portions of different refractive index that interface along a refractive index blend that will provide clear unrestricted vision through the various portions of the lens.

It is another object of the invention to provide a multifocal spectacle lens incorporating a changing refractive index wherein adjacent lens portions have a refractive index blend at their interface that is short in extent and optimized in profile so that the lens portions are invisibly joined and valuable lens area is not wasted It is another object of the invention to provide a multifocal spectacle lens that comprises two layers, one of which incorporates the changing refractive index section and the other which provides a surface on which to incorporate a patient's prescription.

It is another object of the invention to provide a multifocal spectacle lens that comprises two layers, each layer incorporating a changing refractive index profile and power sign opposite the other, so as effectively to increase the refractive index and power difference between viewing portions of the lens.

It is another object of the invention to provide a multifocal spectacle lens that comprises three layers, two adjacent layers incorporating a changing refractive index profile and power sign opposite the other, and the third having a surface on which to incorporate a patient's prescription.

It is another object of the invention to provide a multifocal spectacle lens incorporating a changing refractive index that comprises two layers, each layer having a changing refractive index profile and power sign opposite the other, wherein the refractive index blends of the changing refractive index profiles are either aligned or misaligned.

It is another object of the invention to provide a multifocal spectacle lens incorporating a changing refractive index that comprises three layers, two adjacent layers incorporating changing refractive index profiles and power signs opposite the other, and the third having a surface on which to incorporate a patient's prescription, wherein the refractive index blends of the changing refractive index profiles are either aligned or misaligned.

It is another object of the invention to provide a multifocal spectacle lens incorporating a changing refractive index wherein the lens is free of visible segment edges.

It is another object of the invention to provide a multifocal spectacle lens incorporating a changing refractive index that is free of protruding intermediate and/or near vision segments.

It is another object of the invention to provide a multifocal spectacle lens incorporating a changing refractive index wherein all layers of the lens have surfaces with continuous curvature.

It is another object of the invention to provide a multifocal spectacle lens incorporating a changing refractive index wherein each portion has substantially constant power over its lateral and vertical extent resulting in a large distance vision portion, near vision portion, and, if one exists, intermediate vision portion.

It is another object of the invention to provide a multifocal spectacle lens incorporating a changing refractive index wherein the lens is free of a width-limited corridor of intermediate vision, and wherein the intermediate and/or near vision portions extend to the lateral boundaries of the lens.

It is another object of the invention to provide a multifocal spectacle lens incorporating a changing refractive index that utilizes only spherical curvatures on the surfaces of the layers incorporating a changing refractive index, and which provides excellent optical quality.

It is another object of the invention to provide a multifocal spectacle lens incorporating a changing refractive index that utilizes one or more rotationally symmetric aspheric surfaces to correct for higher order aberrations and to provide a wide range of optically corrected forms for spectacle lens application.

It is another object of the invention to provide a multifocal spectacle lens incorporating a changing refractive index wherein magnification is generally constant within each portion of the lens.

It is another object of the invention to provide a multifocal spectacle lens incorporating a changing refractive index wherein the lens is absent of astigmatism and visualization through all portions of the lens is clear and sharp.

It is another object of the invention to provide a multifocal spectacle lens incorporating a changing refractive index that comprises numerous thin layers, each layer comprising a changing refractive index profile and power sign opposite that of adjacent layers, wherein the thickness of the lens is comparable to that of a standard spectacle lens of similar add power.

It is another object of the invention to provide a multifocal spectacle lens incorporating a changing refractive index in the form of a doublet or triplet Fresnel lens.

It is another object of the invention to provide a multifocal spectacle Fresnel lens incorporating a changing refractive index wherein the slopes of the non-optically functional steps of the Fresnel surface correspond to the angle of gaze of the patient and thereby do not obstruct light rays from an object especially in the peripheral visual field, thus increasing the efficiency of the lens.

It is another object of the invention to provide a multifocal spectacle Fresnel lens incorporating a changing refractive index wherein the slopes of the non-optically functional steps of the Fresnel surface correspond to some degree to the angle of gaze of the patient and thereby partially limit the obstruction of light rays from an object especially in the peripheral visual field, thus increasing the efficiency of the lens.

It is another object of the invention to provide a multifocal spectacle Fresnel lens incorporating a changing refractive index wherein the form of the lens is not flat, but rather curved about the eye, and wherein the slopes of the non-optically functional steps of the Fresnel surface correspond to the angle of gaze of the patient and thereby do not obstruct light rays from an object especially in the peripheral visual field, thus increasing the efficiency of the lens.

It is another object of the invention to provide a multifocal spectacle Fresnel lens incorporating a changing refractive index wherein the form of the lens is not flat, but rather curved about the eye, and wherein the slopes of the non-optically functional steps of the Fresnel surface correspond to some degree to the angle of gaze of the patient and thereby partially limit the obstruction of light rays from an object especially in the peripheral visual field, thus increasing the efficiency of the lens.

It is another object of the invention to provide methods of producing a multifocal lens incorporating a changing refractive index that include resin spraying, resin mixing techniques using dispersed particles and diffusion.

These and other objects and advantages are accomplished by a multifocal lens having continuous curvature and achieving increased power for intermediate and/or near vision through a change of refractive index of the lens. The character of the refractive index blend at the interface of portions of different refractive index results in a lens that provides improved vision and a blend area that is very short in vertical extent or height and practically unnoticeable.

The lens of the present invention employs one or more layers of changing refractive index comprising a multi-layered lens. The changing refractive index profile corresponds to the regions of the lens that provide for vision at two or more discrete distances, similar to a bifocal, trifocal or other multifocal lens, with the orientation of the refractive index transition(s) transverse to a meridian of the lens and generally in a crosswise direction of the lens with the resulting discrete viewing portions in a generally vertical relationship, with a substantially constant refractive index from one surface of the layer to the other. Thus the required power at any point on the lens is instantly and constantly functional through the changing refractive index layer, and the lens therefore may be produced with a minimum center and edge thickness. As an example, in one exemplary lens a 48 mm diameter lens providing '0' power through the distance portion of the lens and 2.5 diopters of add through the near vision portion of the lens may be a thin as 1.76 mm center thickness and 1.13 mm edge thickness.

The refractive index profile is optimized to provide generally constant power for each lens portion. For any given lens size, the extent of the blend area(s) defines the size of the optically functional vision portions of generally constant power connected by the blend areas. Therefore the blind area should be short in extent and have a rate of refractive index change that is smooth and continuous and free from irregularity. A blend area does not function to provide an intermediate zone of vision through its extent, as its extent is less than that required to provide useful optical function. From this standpoint the extent of the blend should be as short as possible so that valuable and useable lens area is not wasted. If the extent of the blend is too short, internal reflectance may occur at certain angles, resulting in a perceptible division between portions of generally constant refractive index. An effective extent of a blend may be on the order of 0.3 mm to 2 mm or more.

In order that the blend be short in extent and fulfill its function of providing an invisible interface between viewing portions of the lens, the rate of change of refractive index defining the blend generally should follow the progression of a ½ sine wave or sine wave like curve from maximum to minimum extrema (pi/2 to 3pi/2). Thus the rate of change of refractive index change in the generally vertical orientation is optimized for the lens. A blend of this sort may be achieved by a number of different processing methods.

Within the last few years advances in polymer chemistry have yielded very high refractive index materials suitable for use in ophthalmic lenses, some with refractive indices above 1.7 and others even approaching 1.8. By using one of these or other high refractive index optical materials in conjunction with a compatible low refractive index optical material, having a refractive index between 1.3 and 1.5, for example, a changing refractive index profile with a large refractive index difference suitable for use following this disclosure may be produced. Various spraying, mixing, diffusion or other processing methods may be utilized to provide the desired gradient characteristics in a consistent and repeatable manner. For example, a spraying technique using two or more spray guns, each containing a mutually compatible resin of different refractive index, moving together along a linear or arcuate path and producing a combined deposit with overlapping or common deposit areas 0.3 to 2 mm or greater in width, can create a varying blend of the component resins over the extent of the common deposit. The overlapping or common sections will comprise a varying volume of material from adjacent guns. A smoothly changing composite mixture of the two resins over this minimally wide common area results in a corresponding change in refractive index from that of the one material to that of the other. The composite resin deposit can be chemically or photo polymerized or otherwise cured.

Various diffusion methods involving diffusion of optical monomers of different composition and refractive index in at least one direction across an interface have been described, for example in U.S. Pat. No. 3,485,556 to Naujokas. For large gradients over substantial extents, for example 20 mm, these methods may be acceptable, as any errors at the interface caused by poor processing methods may be averaged over the length of the gradient and as a result will not cause optical aberrations, but for blend areas short in width the type of which are part of the present invention, greater control may need to be exercised. To this end two methods of diffusion of optical resins are introduced. The first involves the use of a dissolvable polymer membrane that defines a predetermined interface shape that separates two optical resins of different refractive index, and which once dissolved by one or both of the optical resins provides a precise liquid interface for diffusion to commence. The second method involves the use of dispersed particles of particular density that facilitate and accelerate the mixing, blending and diffusion process by their transport through the liquid complex by gravity, buoyancy or centrifugal force. In the case of transport by gravity, for example, micron sized particles of high density are dispersed in the upper-most resin composition and through gravity fall and settle through the body of liquid, each particle introducing a small amount of an above portion resin of one refractive index into a below portion resin of a different refractive index, providing a thorough mixing and blending of the two adjacent liquids just below their interface. Once the particles fully settle out, the liquid composition can be chemically or photo polymerized or otherwise cured.

The lenses disclosed herein may comprise two, three or more layers. In some embodiments of the invention a layer of generally constant refractive index provides either a posterior or anterior surface on which to incorporate a patient's prescription.

In some exemplary lenses reverse changing refractive index profiles are used in adjacent plus power and minus power layers effectively to increase or double the refractive index difference, thereby providing a means of achieving high add values with lower or flatter curvatures and reducing lens thickness. At least one pair of reverse changing refractive index sections is required to achieve the increase in refractive index. For example, if a changing refractive index profile defines a maximum refractive index difference of 0.3, by using 1) a changing refractive index layer wherein the high refractive index portion comprises the lower near vision portion of a plus power layer, in combination with 2) a reverse changing refractive index layer wherein the high refractive index portion comprises the upper distance vision portion of an adjacent minus power layer, the effective refractive index difference is doubled to equal 0.6. This very large index difference may be used advantageously to provide a high diopter add power in a thin lens design in accordance with the present invention.

In another exemplary lens consists of numerous thin layers of alternating changing refractive index layers with reverse profiles and power values. For example, a 50 mm diameter composite lens providing 2.5 diopters of add power may comprise 13 low curvature layers each having a critical thickness as low as 0.22 mm while the overall lens thickness may approximate that of a standard lens of similar add power. Plus power layers with an increasing refractive index and increasing plus power in one direction and 0.22 mm in center thickness alternate with adjacent minus power layers having an increasing refractive index and increasing minus power in the opposite direction, 0.22 mm in edge thickness, thereby producing what may appear to be a plano power lens or window 1.5 mm thick, but actually what is a bifocal or trifocal lens with substantial add power. By using alternating changing refractive index layers in this manner the effective refractive index difference is increased as previously described. Because each layer is very thin and may be processed sequentially or independently, certain methods of manufacture that provide good blending results when thin sections are produced may be utilized to advantage. For example, the spraying method previously described is ideal for providing a thin layer of a blended refractive index composition.

Although it may be desirable to be able to spray in thick sections this will not always be possible as the density of one resin or monomer may be greater than the other, resulting in one sliding under the other by the pull of gravity. This problem can be avoided by limiting the volume of material applied and the time over which the spray application occurs when densities are substantially different. Each layer may be fully or partially cured or polymerized after application, and prior to subsequent layer applications. If the base surface upon which the spray is applied comprises a material with desirable flexural characteristics it may be altered in shape by the small amount needed to produce the necessary convex and concave curvatures required to impart the correct radius for each gelled or partially polymerized layer.

There may be other reasons as well to limit the thickness of an application layer. For example, some photo polymerization processes or materials provide suitable results only to limited depths of the resin or monomer. Other processes designed to change the refractive index of a polymer, such as electron beam irradiation or chemical treatment with a penetrating reactive diluent or swelling agent, may provide suitable results only to limited penetration depths or through relatively thin sections, thus the independent or sequential processing of very thin adjacent layers as described may be accomplished by these means.

In another embodiment of the invention the multi-layer multifocal lens takes the form of a doublet Fresnel lens comprising one or two changing refractive index layers. A Fresnel lens surface comprises numerous discontinuous coaxial annular sections each defining a slope corresponding to a continuous lens surface geometry, collapsed to form a surface of lower profile. Joining each annular section is a non-optically functional step that in conjunction with the refracting surfaces determines the overall geometry and lens thickness. High plus and minus powered Fresnel lenses may be produced at a fraction of the thickness of conventional lenses, many with a maximum step height under 0.26 mm. By applying a changing refractive index layer thick enough to fill the open areas of a short focal length Fresnel surface, for example, 0.3 to 0.4 mm thick, a bifocal or trifocal lens of the present invention may be achieved in an extremely thin lens configuration. Here again the above-described spraying technique provides an ideal method of application of a changing refractive index layer 0.3 to 0.4 mm thick. The disclosure describes the use of two novel Fresnel lens designs providing increased efficiency and effectiveness.

Lenses following the teachings of this disclosure may be designed in a number of typical lens shapes or forms utilizing either spherical or aspheric curvatures. By shape or form is meant the general overall contour of the lens, that is, whether its front and back surfaces are flatter, having a lower value base curve, or more highly curved, with a higher value base curve. Excellent optical quality may be obtained using spherical surfaces over a wide range of forms, with particular forms providing improved performance over others. Generally speaking, lens forms which are normally considered to be highly curved for spectacle lens applications tend to perform better and produce less marginal astigmatism at the standardized spectacle lens distance from the eye than less highly curved forms. In the case of a spherical lens design incorporating plus or minus power to meet a patient prescription, a particular corresponding form may provide the best performance. Alternatively, by using the appropriate conic constant to asperize those designs that require correction of marginal astigmatism, aberration can be minimized and the optical quality for a wide range of base curves and prescriptions can be optimized, thereby widening the choice of lens forms and allowing flatter base curves to be used without compromise of optical quality. For those lenses requiring a greater degree of astigmatic correction with higher conic constant values, a reduction in distortion or non-uniform magnification in the more highly powered portions of the lens may also be achieved. Slight aspheric over-correction with a higher conic constant value or additional aspheric terms may be employed to further reduce lens thickness or change the magnification characteristics of the lens as desired.

Other features and advantages of the invention will become apparent from the following description of the invention in conjunction with the accompanying drawings.

BRIEF DESCRIPTION OF THE DRAWINGS

FIGS. 1a, 1b and 1c are illustrative side views a first group of multifocal lenses incorporating a single plus power changing refractive index layer in a doublet lens configuration comprising concave, plano and convex internal surfaces.

FIGS. 2a, 2b and 2c illustratively show bifocal and trifocal resin casting chambers incorporating dissolvable membranes separating resin portions.

FIG. 4 shows a table of lens parameters of the lenses illustratively depicted in FIGS. 1a, 1b and 1c.

FIG. 5 is a chart showing lens radius relationship values for different refractive index valued lenses having a range of add powers.

FIG. 8 is an illustrative side view of a second group of multifocal lenses incorporating a single minus power changing refractive index layer in a doublet lens configuration comprising a concave internal surface.

FIG. 9 is an illustrative side view of a third group of multifocal lenses incorporating a single posterior plus power changing refractive index layer in a doublet lens configuration comprising a concave internal surface.

FIGS. 10a, 10b and 10c illustratively show side views of fourth group of multifocal lenses incorporating a single posterior minus power changing refractive index layer in a doublet lens configuration comprising concave, plano and convex internal surfaces.

DETAILED DESCRIPTION

Figure 3A:
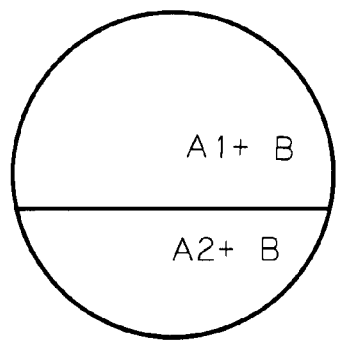
FIGS. 3a, 3b, 3c, 3d, 3e and 3f illustrates various multifocal versions of the present invention.

The following is a disclosure of how to make and use the inventions described in the claims, including the best mode of carrying out the claimed inventions known to the inventor on the effective filing date. Referring to FIGS. 1a, 1b and 1c there are collectively shown three doublet lens configurations of a first exemplary lens constructed following the teachings of this disclosure. FIGS. 1a, 1b, and 1c represent possible lens forms of both bifocal and trifocal lenses. Anterior lens section A comprises a changing refractive index layer and posterior section B comprises a generally constant refractive index layer of the lens. By anterior is meant a front position and further from the eye and by posterior is meant a rear position and nearer the eye. Section A has plus power and section B has minus power. In this embodiment the refractive index of the near vision portion is greater than that of the distance vision portion, therefore providing add power for near vision.

Separately, FIG. 1a shows an embodiment wherein the internal interface curvature R2 is concave with respect to lens section A, FIG. 1b shows a lens embodiment wherein the internal interface curvature is plano, and FIG. 1c shows a lens embodiment wherein the internal interface curvature is convex with respect to lens section A. In the figures, surface and layer designations for the three figures are shown in FIG. 1a, portions designating a bifocal lens are shown in FIG. 1b and portions designating a trifocal lens are shown in FIG. 1c.

Referring to FIG. 1b, bifocal lens layer A is comprised of an optically transparent material having two portions with different refractive index values. A1 corresponds to the distance vision portion of the lens and has a refractive index value N1. A2 corresponds to the near vision portion of the lens and has a refractive index value N2. N1 and N2 are generally constant refractive index values. Dotted line 2 represents the refractive index blend interface of N1 and N2 FIG. 1c in like manner shows a trifocal lens wherein layer A is comprised of an optically transparent material having three portions each with different refractive index values. A1 corresponds to the distance vision portion of the lens and has a refractive index value N1. A2 corresponds to the intermediate vision portion of the lens and has a refractive index value N2. A3 corresponds to the near vision portion of the lens and has a refractive index value N3. N1, N2 and N3 are generally constant refractive index values. Dotted line 2t represents the refractive index blend interface of A1 and A2 and dotted line 3t represents the refractive index blend interface of A2 and A3.

In reference to the FIGS. 1a, 1b, and 1c, posterior lens layer B is comprised of an optically transparent material whose refractive index N4 is generally constant. Anterior surface 4 of lens layer A has a curvature with a radius value R1, internal interface I has a curvature R2, and posterior surface 5 of lens section B has a curvature with a radius value R3. In this and subsequent lens examples, lens sections may be produced as preforms and bonded together using an optical cement, or a succeeding layer may be cast against and bonded to the surface of a preformed section. By preform is meant a solid or semi-solid shape formed prior to the casting or cementing of a lens section. A perform lens section may be produced by thermoforming, molding, grinding, casting or other process.

Refractive index blend interface 2 of FIG. 1b and refractive index blend interfaces 2t and 3t of FIG. 1c, as well as all other refractive index blend interfaces of subsequent embodiments and examples, have refractive index profiles that increase from a lower refractive index value equal to that of the adjacent portion with lower refractive index to that of the opposite adjacent portion with higher refractive index, the changing refractive index profile following a rate of change which is smooth and regular and which can be generally characterized along its extent as corresponding to the progression of a ½ sine wave or sine wave like curvature, from its pi/2 to 3pi/2 position. Such an interface profile may be produced using a number of different processing methods.

Inter-diffusion of two monomers at a liquid interface or diffusion of one monomer into a partially polymerized or gelled monomer of a different refractive index are methods that provide useful refractive index gradients with high refractive index difference values. Mutual solubility or miscibility and inter-diffusive penetration of a lower viscosity monomer into a higher viscosity gelled 'pre-polymer' are the factors combined with heat and duration that determine the diffusion and refractive index gradient depth. These approaches may work equally well with the more recently developed optical monomers and resins yielding very high refractive index values suitable for use in ophthalmic lenses, as previously mentioned.

Materials containing for example disulfide, thiol, polythiol or polyisocyanate compounds and some epoxies have been shown to provide refractive indices between 1.65 and 1.78. Numerous methacrylate or other resins containing fluorine or fluoro polymers have refractive index values as low as 1.36 or below, and may suitably be used in conjunction with compatible high refractive index materials in spray or diffusion processes.

Due to the fact that the refractive index blend area of the present invention is minimal over its extent, on the order of 0.3 to 2 mm or more, it is very important that the interface of the discrete refractive index portions have no irregularities or undesirable contours, including the meniscus that typically may form along the top surface of a liquid in a vessel, such as a lens casting chamber or mold that may be used in the diffusion/casting process. Especially if the viscosity of the liquid optical resin is high, the meniscus formed at the lens chamber and resin boundary will be highly curved. If the lens casting vessel is narrow in its interior dimension the meniscus can be continuous across the interface, and of course will remain if the material is partially polymerized to a gel state. An interface deformity existing prior to diffusion will produce a refractive index blend aberration at the completion of the diffusion process. Whatever process is used to create the refractive index blend, the interface may have a planar, cylindrical, cylindro-aspheric, conical or similar shape, with the planar dimension extending perpendicular to the length of the interface, that is, through the lens. Another similar problem relates to the application of one liquid monomer on top of or next to another and how to preserve the integrity of the interface during the application. Some have suggested the use of a removable separator or barrier, but ever so minute disturbances at the interface caused by the movement of the separator, especially when it is lifted from the pool of liquid, can be detrimental to the changing refractive index profile.

Both problems may be solved by utilizing a new diffusion method involving the use of a dissolvable polymer membrane as a separator within the casting chamber. Both resins may contact the separating membrane and following dissolution of the membrane by one or both of the resins, undergo inter-diffusion or diffusion of one resin into the other followed by full polymerization or curing of the resin complex mixture. The membrane should be thick enough so that it withstands the weight or pressure of a first resin introduced prior to the addition of the second resin in the adjacent chamber portion on the opposite side of the membrane, but thin enough to dissolve within a desired period of time, for example within 1 hour. A polymethylmethacrylate film membrane 0.012 to 0.025 mm thick may provide the desired attributes. A copolymer membrane having a refractive index as a mean or variable value between that of the high and low refractive index resins may also be used.

Referring now to FIG. 2a there is shown a casting chamber for an 'Exective' style bifocal lens including dissolvable membrane M1 sandwiched between vertical lens chamber sections S1 and S2. Section S1 corresponds to the distance vision portion A1 of the lens and section S2 corresponds to the near vision portion A2 of the lens. Chamber S1 is filled with one refractive index resin and chamber S2 is filled with the other refractive index resin through ports P1 and P2 respectively. If the resin of a lower section is gel polymerized prior to the dissolving of the membrane, its density may be less than that of the resin of an upper section, otherwise the resin having greater density should be placed in the lower portion to avoid undesirable mixing and resettling of the liquid resins once the membrane dissolves. If the resins have the same density either may be positioned in the upper or lower section, furthermore the sections may be positioned side by side.

During or near the end of the filling process the casting chamber may be tilted to insure air bubbles are allowed to escape through filling ports P1 and P2. Once the chamber portions are filled the membrane should be allowed to dissolve into one or both of the resins at which time the diffusion process will begin. After the required diffusion takes place, creating the 0.3 to 2 mm or greater blend interface, the lens resins may be fully polymerized by either photo or catalyst polymerization.

FIG. 2b in like manner shows an "Executive" style trifocal lens with a rounded lower near vision portion refractive index blend interface. Membranes M2 and M3 are sandwiched between lens chamber sections S3 and S4 and S4 and S5 respectively, creating refractive index resin sections N1, N2 and N3. Refractive index resin sections N1 and N3 comprise the distance and near vision portions of the lens respectively, and N2 comprises an equal mixture of N1 and N3, creating an intermediate refractive index and vision portion of the lens. Although not shown in the figures, the membranes may be pitched in a forward or backward direction to create a sloped refractive index orientation angle. In such instances the mold chamber may be tilted to the same slope angle during the diffusion and polymerization processes to insure the interfaces maintain the desired slope angle. The resins may be filled with the mold chamber tilted as described before in order to allow escape of air bubbles through the filling ports. Furthermore, as shown in FIG. 2c, the chamber may be positioned and used in an upside down orientation to insure any residual air bubbles will not be trapped in the central area of the downward facing concavity of membrane M3, but instead will rise and follow the curvature of the membrane upward to the far left or right side of the mold chamber towards filling ports P3, P4 and P5, out of the area of the optical portion of the lens.

Figure 21:
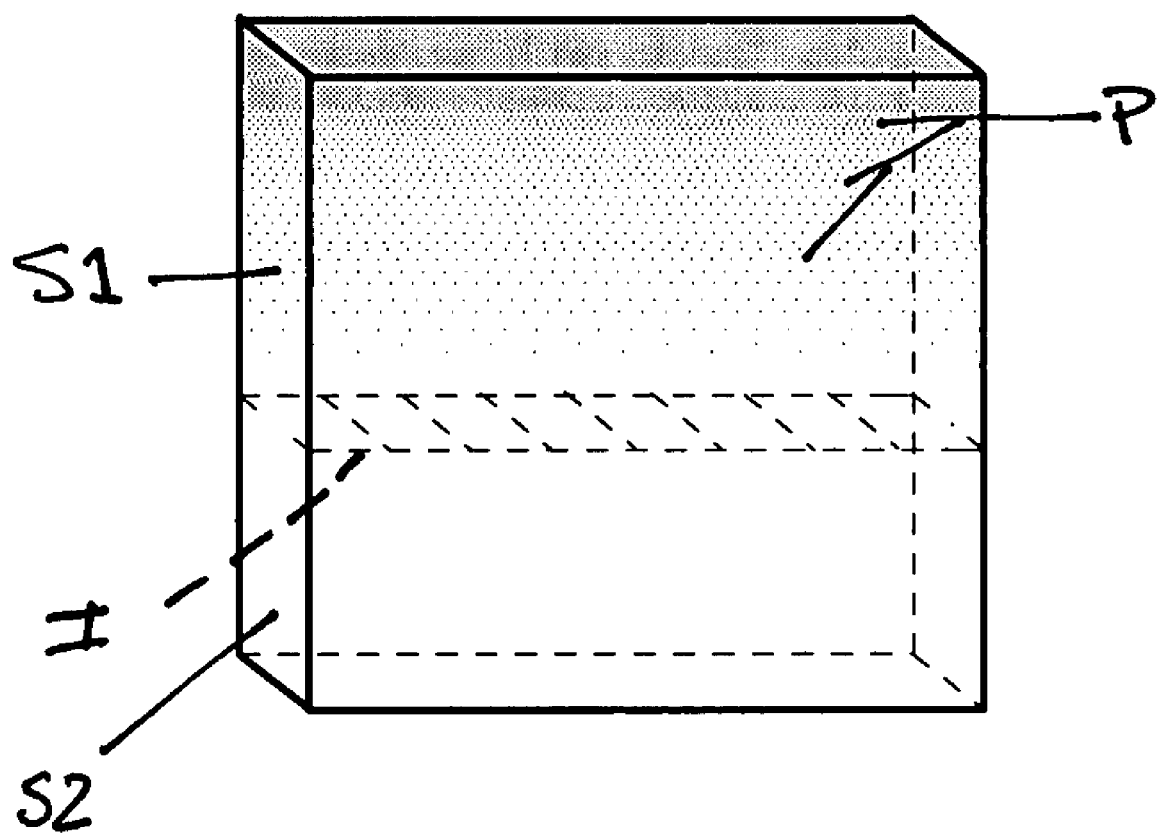
FIG. 21 illustrates the mixing of two liquids by particles descending through the interface separating the liquids.

An additional method to facilitate and quicken the creation of the refractive index blend involves the controlled mixing of resin or monomer solutions of different refractive index in a vessel or mold chamber such as the above-described membrane containing mold chamber. To this end, two or more vertically or otherwise adjacent layered component resin solutions of different refractive index can be blended at their interface(s) through the use of fine particles, such as glass beads, dispersed in the top layer solution. FIG. 21 illustrates this process schematically in a vertically oriented mold arrangement. In FIG. 21, particles P (not to scale) are shown as they begin their descent through the upper liquid in the upper lens chamber section S1 toward and through the interface I (indicated by dashed lines in the middle of a mold chamber). The particles P are shown as being concentrated in the upper portion of the top layer solution, but they could as well be dispersed evenly through the upper liquid. Either way, they slowly settle through the upper liquid and through the interface I. The particles settle through gravity or centrifugal force into and through the lower layer solution or solutions, and in so doing create a blend zone below the original interfacial level. The particles may be up to 50 microns in diameter, for example, with the concentration of the particles, as well as their size being selected to control the extent of the blend. While the use of particles is illustrated in connection with forming a lens having two refractive indices joined by a blend, it can also be practiced with multiple blends in connection with the lens making techniques shown and described in connection with FIGS. 2b and 2c.

Gravity and centrifugal force are not the only forces and fields that may be used to move the particles through the layer(s) of solution(s). With charged particles or particles influenced by magnetic fields, electric and/or magnetic fields may be used. However it is propelled, each falling and settling particle from the above layer solution drags with it a small amount of the above layer solution through the interface into the adjacent below layer solution where it is cleaned of the single component resin covering as it passes through the liquid. Not only does the particle carry the resin from the above layer solution to the adjacent below layer solution, it also micro-mixes the solution in the area it passes through. As stated, this method may be used in molding or casting chambers including or absent of the membrane system previously described. The process may also be implemented in a mold arrangement wherein the layered resin solutions are situated side by side, in which case a field other than gravity will be required to provide a sideways motion of the particles from one adjacent solution to the other.

Multi-portioned lenses including bifocals, trifocals and quadrafocals may be made by this method. For example, by using 0.01 gms of 5 micron diameter glass bead per every 10 gms of resin 25 mm in height, a controlled and thorough mixing and blending occurs just below each original interface over the specified short distance defining the refractive index blend extent. Once the particles fully settle out of the liquid over a period up to 15 hours or more, the composition can be chemically or photo polymerized. Conversely, particles with a density less than that of the resins used in casting the lens may be dispersed in the lowest layer solution which due to buoyancy will rise through the solutions and in like manner produce the refractive index blend interfaces. The particles will rise to the top of the chamber out of the useful area of the lens body. Either or both rising and settling particles may be used to produce the refractive index blends. This method may be used in molding or casting chambers including or absent of the membrane system described above.

Referring again to FIGS. 1b and 1c, refractive index blend lines 2, 2t and 3t may be located at different levels of the lens as indicated by the Y direction shown in FIG. 1a. The indicated dotted lines represent the refractive index interfaces at the top-most aspect of the bifocal and trifocal portions of the lens. When the near or intermediate portions have a curved interface, the dotted lines represent the highest point of the curved portion with respect to a horizontal line. In the case of flat top or "Executive" style interfaces, the dotted lines correspond to the straight-across top level of the interface.

As an example of the different levels of the blend lines, bifocal blend line 2 of FIG. 1b may be located 6 mm below a centerline CL thereby providing a bifocal interface corresponding to a level approximately 2 mm below a patient's lower lid margin. Trifocal blend lines 2t and 3t may similarly be located at different positions in relation to centerline CL, and with regard to one another, but in general for a trifocal lens of the present invention better performance may be achieved with line 2t shifted upward slightly compared to line 2 of FIG. 1b in order to introduce the intermediate vision portion of the lens with somewhat less downward gaze, for example with line 2t at a distance 3 mm below a centerline CL and line 3t at a distance 7 mm below line 2t. As with conventional prior art multifocal lenses, the segment positions of the present invention may vary greatly based on the design and application of the lens.

Figure 3B:
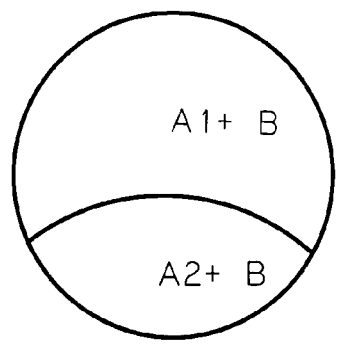
Figure 3C:
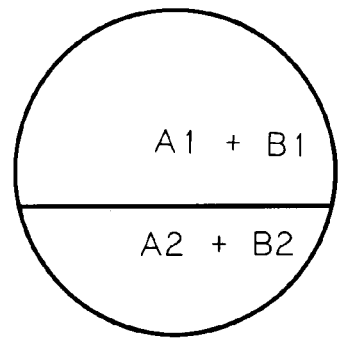
Figure 3D:
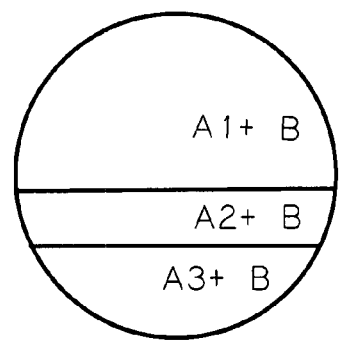

Referring to FIGS. 3a through 3f there are shown six of the most common types of bifocal and trifocal lens configurations that may be produced following the teachings of this disclosure. In the Figures the portion designations A1, A2, A3 and B refer to the vision portions of the lens as defined with reference to FIGS. 1b and 1c. FIG. 3a shows an "Executive" style bifocal configuration wherein the refractive index blend interface is straight or generally straight across the lens in a horizontal direction. FIG. 3b shows a round topped style bifocal similar to that of 3a except that the refractive index interface blend is curved towards the near vision portion of the lens, providing additional viewing areas for distance vision towards the sides of the lens. FIG. 3c shows an "Executive" style bifocal lens similar to 3a, but comprising two sections A and B having changing refractive index profiles A1, A2 and B1, B2 respectively, in reverse orientation to one another, thereby achieving a high refractive index difference and high add value in a thin lens design, as later described with reference to FIGS. 11a and 11b. FIG. 3d shows an "Executive" style trifocal lens comprising two refractive index bends within one section or layer of the lens as illustrated in FIG. 1c.

Figure 3E:
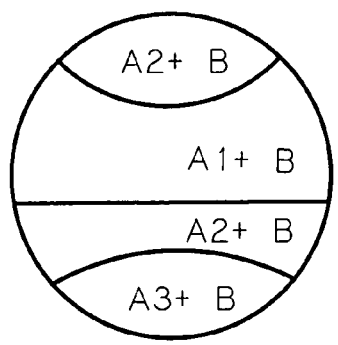
Figure 3F:
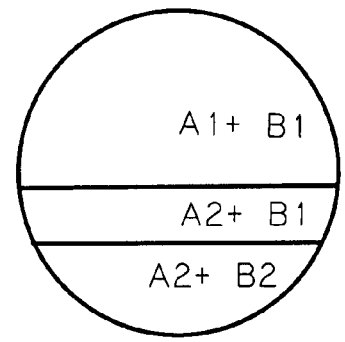
Figures 11A, 11B, 12A, 12B:
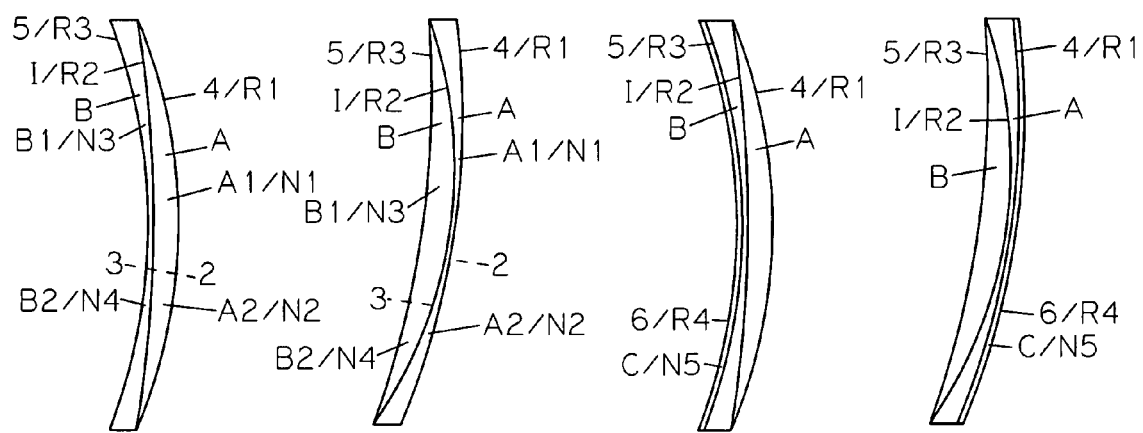
FIGS. 11a and 11b illustratively show side views of a fifth group of multifocal lenses incorporating two changing refractive index layers in a doublet lens configuration comprising plus and minus power layers in both anterior and posterior positions.
FIGS. 12a and 12b illustratively show side views of a sixth group of multifocal lenses incorporating two changing refractive index layers in a triplet lens configuration comprising plus and minus power layers in both anterior and posterior positions and a third layer having a surface on which to incorporate a patient's prescription in both anterior and posterior positions.

FIG. 3e shows a quadrafocal lens comprising four portions, the three lower of which provide a trifocal function and the top portion A2 which provides a second intermediate vision portion above the distance vision portion. This lens combines the benefits of an "Executive" style flat top for the intermediate portion with that of a curved refractive index blend for the upper and lower portions. FIG. 3f shows another lens with two bifocal sections A and B each having changing refractive index. In this lens the refractive index blends of each section are misaligned with the blend of section B lower than that of section A, thereby producing a trifocal lens with an intermediate vision portion comprising A2 and B1 as illustrated in FIG. 11b.

FIG. 4 is a table listing relational values for spherical curvatures R1, R2 and R3, representing example lenses illustratively depicted in FIGS. 1a, 1b and 1c. Each of the lenses 1 through 7 has a constant edge thickness of 0.05 mm for lens section A and a constant center thickness of 0.25 mm for lens section B, with total lens center and edge thicknesses varying only slightly over the range of example lens forms as indicated in the table. The two columns on the far right include conic constant values and additional information for aspheric versions of each of the examples. In FIG. 4 and all subsequent lens examples, the conic constant, designated CC, is listed along with radius R, center thickness CT and edge thickness ET in millimeters, and is identified with an (a) for anterior and (p) for posterior indicating the lens surface for which it has been calculated. Radii, center thickness and edge thickness values pertain to spherical lens versions only.

Lenses 1 through 7 provide '0' diopters of power in the distance vision portion and 2.5 diopters of add power in the near vision portion of the lens. The intermediate power of the trifocal lens versions is 1.25 diopters. The add power of this and all other lenses discussed in this disclosure is in terms of diopters and calculated as 1000/effective focal length. The selection of '0' power in the distance vision portion of the lens represents a standard for distance vision assuming an emmetropic eye, and is calculated as equal to an effective focal length not less than +/−1e+009. The lenses disclosed of course will require modification such as lab work when incorporating a patient's prescription, but as any prescription value is in terms of diopters departure from emmetropia, the basic reference of '0' power, corresponding to emmetropia, will be maintained for all calculations throughout this disclosure. All radii and power calculations are based on refractive index, nd, calculated at the helium d-line (587.56 nm). Alteration of surface 5 to incorporate a patient's prescription needs or provide other function will modify both the distance and near vision power but will not change the add power provided by the lens. The lenses have the additional following refractive index parameters:

| Bifocal: | Trifocal: |
|---|---|
| N1 = 1.46 | N1 = 1.46 |
| N2 = 1.7 | N2 = 1.58 |
| N4 = 1.58 | N3 = 1.70 |
|  | N4 = 1.58 |

With the refractive indices, add powers, lens layer thicknesses and '0' power for distance maintained constant as stated, there may be seen an additional constant with regard to the relationship of R1, R2 and R3 over a full range of possible lens forms, as exemplified, expressed as the curvature relationship and efficiency number or CREN, as listed in FIG. 4. The CREN is a numeric value that defines the relationship between the radii of the surfaces of a lens of the present invention, based on the '0' power standard described above and stated in terms of diopters. It also represents the total convex diopter curvature attribute or 'gross sag' of a lens, and will in every case will be a positive value and greater than the add power of the lens. Each lens of the present invention can be defined by a CREN number, and as such CREN values for all subsequent lens examples are listed with other defining lens parameters.

It is the nature of the lens of the present invention that it requires extra bulk or 'convexity' to provide add power through refractive index change in conjunction with a symmetrically rotational surface. Furthermore, the increased plus power of lens layer A needed to achieve the add value or power difference between the distance and near vision portions of the lens must be reduced to the reference '0' power or patient prescription value in the distance vision portion of the lens by the minus power portion B, thus the 'gross sag' of the lens will be further increased. The CREN number may range from between 40 and 50 for lenses with add powers from 1 to 3.5 diopters, when the efficiency is lowest and the bulk is greatest, to between about 3 and 11 for the same add powers when the efficiency is highest and the bulk is least. Such a high efficiency value allows for a lens with minimal thickness. The CREN may be calculated by the following formula:

$$1000/R1 + 2(1000/R2) + 1000/R3 = CREN,$$

wherein R1 is positive when convex and negative when concave, R3 is positive when concave and negative when convex, and R2 is positive when its curvature is convex with respect to lens section A and negative when its curvature is concave with respect to lens section A. For lenses that incorporate a power other than '0' in the distance vision portion of the lens, the CREN may be determined by first canceling the added power or prescription value and then doing the calculation.

Lenses having a low CREN are most desirable as their bulk and critical thickness will be least. The CREN number is highest when the refractive index difference (RID) between the upper and lower aspects of the lens is least, on the order of 0.08 to 0.16, as shown at the top portion of the table, and lowest when the RID is greatest, on the order of 0.60 or greater, shown at the bottom portion of the table. Medium and high RID values can be obtained by using both very high and very low refractive index component optical resins together to create the changing refractive index profile of section A.

The example lenses of the present example have a RID value of 0.24 (1.7−1.46=0.24). If the two component materials selected for use in the changing refractive index layer have relatively higher or lower refractive index values than in the example lenses above, yet produce the same RID value, the calculated values for R1 and R2 will be substantially the same, but R3 and therefore the calculated CREN value will be different with no change in the refractive index of section B. By adjusting the refractive index of section B in a corresponding direction, identical values for R3 and CREN may be produced, nonetheless in order to achieve a low CREN value and superior optical quality the refractive index of layer B should be high. Higher RID values may be obtained by using component optical resins with a greater refractive index difference. For example, a 0.32 RID value may be obtained by using a 1.42 low refractive index resin component in conjunction with a 1.74 high refractive index component to create the changing refractive index profile. The lens' RID value may also be increased in accordance with the methods of the present invention to a value double the maximum value of the refractive index difference of two component resins, i.e. 0.64, by means discussed more fully below.

FIG. 5 is a table listing the CREN values of a complement of lenses of the first embodiment according to the RID of the changing refractive index layer(s) and add power of the lens. The refractive index values for all calculations are those listed above with reference to FIG. 4. Add powers in the table range from 1 to 3.5 diopters. The CREN numbers for the example lenses above, having all parameters the same except for lens form, range from 18.436 to 18.729, and define the major portion of the 18.07-19.10 range listed in the category at the intersection of the 0.24 RID and the 2.5 diopter add. The category range on the chart has been widened by 2% beyond the numerical range of the example lenses to 18.07-19.10 to include additional lens forms not included in FIG. 4. The other category ranges in FIG. 5 likewise have been widened by 2%. The 18.07-19.10 CREN range represents a very usable but just medium efficiency group of changing refractive index lenses of the present invention.

As can be seen from the table, the lower CREN number ranges, representing the most efficient designs, are located where add power is least and RID values are greatest. Lower add powers obviously will require less refractive index change. The most efficient CREN category on the chart, 3.05-

3.19, designates a total of approximately 3 diopters of bulk or 'gross sag' to provide 1 diopter of add. With high CREN values greater bulk translates to steeper R1 and R3 curvatures, even with convex internal interface radii. Therefore for higher CREN values there naturally will be a corresponding limitation of the forms that are useful. For example, a 3.5 diopter add lens with a 0.16 RID and a CREN value of 41.18 will be quite steep on both its anterior and posterior surfaces, having a convex R1 curvature of 80.0 mm and a concave R3 curvature of −102.242 mm, even though the interface curvature has a steep convex R2 radius of 105.809 mm. The same 3.5 diopter add lens with the same 0.16 RID value having a concave internal interface R2 curvature of −400 mm will have a convex R1 curvature of 42.739 mm and a concave R3 curvature of −46.144 mm and a CREN value of 40.07. Although the steeper lens demonstrates better optical quality compared to the one with an R1 curvature of 80.0 mm, from a cosmetic standpoint such a highly curved lens would likely be undesirable. Nonetheless each of the CREN ranges of FIG. 5 are calculated from a range of lens forms including steeper versions such as the one above. CREN categories above 50, representing very inefficient designs, are not included in the chart as the thickness, weight and high curvature of lenses producing these CREN values will have limited usefulness.

The table also shows the approximate maximum RID of a first layer of changing refractive index, or in the case where only one lens layer comprises a changing refractive index, the maximum RID of the lens. The demarcation, situated at the 0.32 RID level, is based on the use of available compatible optical resins having both extremely high and extremely low refractive indices. It is anticipated that other materials with both higher and lower refractive indices may be used to create a greater RID, and in such case the potential CREN may be lower. It is also possible, as previously mentioned, to use two changing refractive index profiles in reverse orientation to increase the RID and lower the CREN. In such a case values beyond the first line and up to the 'Approximate maximum RID of the lens' will be applicable. Alternatively, when two reverse orientation changing refractive index layers are produced with materials of more moderate refractive index, such that the RID value of each is less than that of layer A in the example lenses of FIG. 4, the additive RID may still surpass that of a lens with only one changing refractive index layer with a maximum RID value, producing a very efficient and thin lens.

Figure 6:
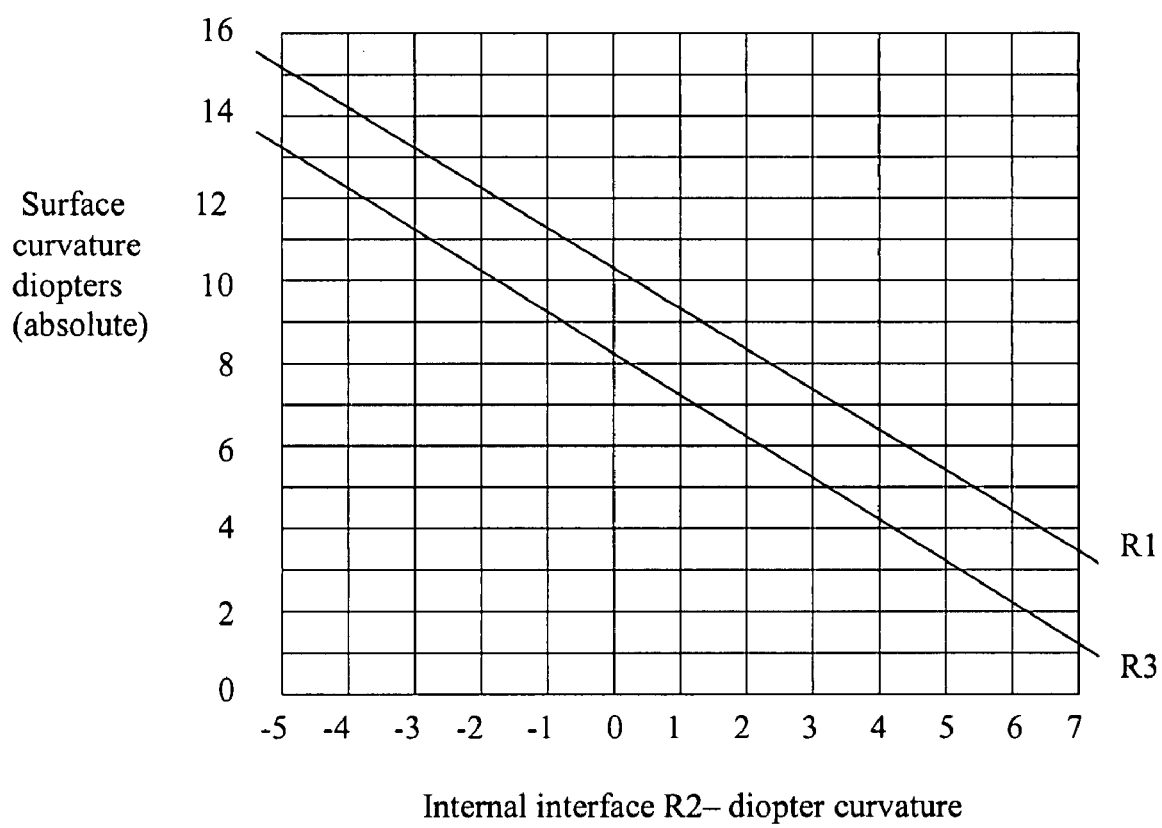
FIG. 6 shows a graph plotting anterior and posterior surface curvatures against internal surface curvature of the changing refractive index lens.

As indicated above, a family of lenses having various constants including refractive index, RID, add power, constant edge thickness of 0.05 mm for lens layer A and a constant center thickness of 0.25 mm for lens layer B, may assume a variety of shapes defined by a specific relationship between R1, R2 and R3, calculated as the CREN value. With different base curves and lens shapes, therefore, R2 must be a specific value to achieve the add power(s) and specified standard of '0' power through the distance vision portion of the lens. From FIGS. 1a, 1b and 1c and FIG. 4 it can be seen that over a range of possible lens shapes, R2 corresponds to R1 and R3 typically by exhibiting a bending in the direction of greater convexity (with respect to lens layer A) with flatter convex R1 and concave R3 curvatures and in the direction of greater concavity (with respect to lens layer A) with steeper convex R1 and concave R3 curvatures. FIG. 6 graphically depicts this relationship by plotting diopters of curvature of R1 and R3 against a range of diopter values of R2. The graph plots the example CREN family of lenses of FIG. 4 with concave, plano and convex internal interface R2 curvatures, and satisfies the CREN equation listed above, which converted to surface diopters is $$D1 + 2D2 + D3 = CREN,$$

thus further illustrating the character of the lens of the present invention. The relational values shown of course will change when the refractive index values N1, N2 and N3 are different than those of the example lenses.

As mentioned, excellent optical quality may be obtained using spherical surfaces over a wide range of forms, with lenses having what are typically considered to be more highly curved surfaces tending to produce less marginal astigmatism and better focus. The magnitude of the conic constant values shown in FIG. 4 indicates the degree to which correction is required and which example lens designs perform better with little or no aspherization. Clearly the #7 lens example, which has the highest CREN value and flattest R1 and R3 curvature values requires the greatest amount of correction, calculated as a theoretical conic constant value of −14.879. Conversely, the steeper #1 lens, for example, with the lowest CREN value, requires almost no correction at all. It should be noted that correction of the lens of the present invention with aspheric curvatures cannot provide optimal visualization for all lens portions as the power and therefore the amount of correction will vary across the lens. Generally speaking, less correction is required for the upper distance vision portion of the lens regardless of its form, therefore conic constant values lower than those listed for the flatter form lenses may be selected so that some correction is achieved without loss of optical quality in the distance vision portion of the lens. A somewhat steeper lens form requiring less aspheric correction may provide an alternative when the cosmetic appeal of a very flat lens is not the primary concern, and in the case of the example lenses of FIG. 4, lens #6, for example, would provide an excellent alternative to lens #7. Since there is no single radius value defining an aspheric surface that can be used to accurately calculate the CREN value, substituting a best fit sphere for each aspheric surface will provide a more accurate calculation of the CREN number. The radius of the best fit sphere for lenses with negative conic constant values will always be less highly curved than the apical radius of curvature of the conic, and therefore the calculated CREN number will be lower. For example, using a best fit sphere radius of 195.1687 mm instead of the apical radius of curvature of the aspheric surface of lens #7 (not listed), the recalculated CREN number is 18.419. This value by comparison is closest to the CREN value of lens #1, which calls for almost no correction. All recalculated CREN numbers derived by using best fit spherical counterparts for the aspheric versions of lenses #1 through #7 are listed in the table of FIG. 4. As can be seen, all the best fit sphere CREN values are very close to one another and to the CREN number of lens #1, which is practically optimal from the standpoint that it requires no aspheric correction. Thus a narrow CREN range can be said to define a family of lens forms sharing common optical traits. This notwithstanding, a wider CREN range as previously described, rather than the more narrow range as exemplified in FIG. 4, is listed in the table of FIG. 5 in case non-corrected spherical lens versions are utilized.

Figure 7A:
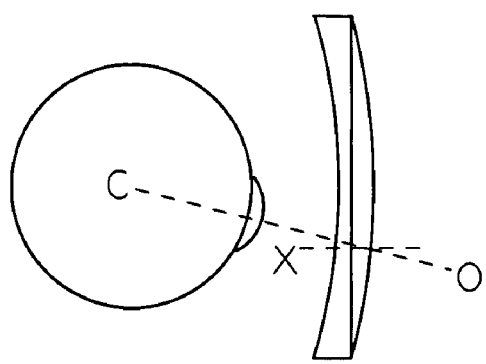
FIGS. 7a, 7b, 7c and 7d illustratively show different orientation angles of a changing refractive index lens layer.

FIGS. 7a, 7b, 7c and 7d show four versions of the first embodiment of the lens in which the orientation angles X of the refractive index blend differ. By orientation angle of the refractive index blend is meant the angle that defines at least a portion of a surface, such as a plane, that intersects the refractive index blend in which there is substantially a constant refractive index. By appropriately selecting the refractive index blend orientation angle, vision through the refractive index blend(s) of the lens at a particular angle of gaze of the patient, represented by lines CO in the figures, will be optimized and free of aberration and blur that otherwise may result when a line of sight of the patient through the blend is at an angle wherein the refractive index is not constant, as can occur when the orientation angle is '0' or different than the angle of gaze, as illustrated in FIG. 7a.

Figure 7B:
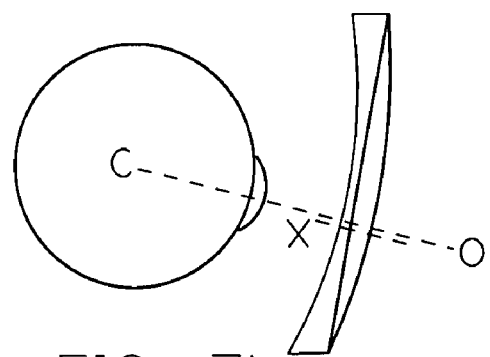

There are two ways to achieve an orientation angle that approximates or equals the angle of gaze of the patient looking through a refractive index blend area of the lens. The first involves tilting of the lens in the spectacle frame with respect to the angle of gaze of the patient when looking in a generally straight ahead direction through the center portion of the lens. Such a positive angle of tilt is on the order of 8°, with the upper distance portion of the lens pitched forward with respect to other areas of the lens, as shown in FIG. 7b. Not only does a small tilt satisfy the orientation angle criteria with respect to the refractive index blend of the lens, it also may provide somewhat improved visualization of objects viewed through the lower portion of the lens, as the bundles of rays passing from a viewed object to the eye and passing through the lens do so at an angle more nearly normal to the surface area of the lens transmitting the light bundles.

Figure 7C:
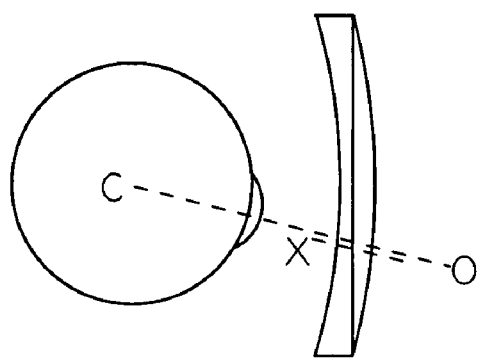
Figure 7D:
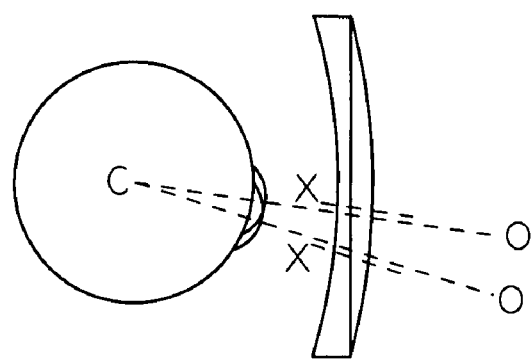

A second way to achieve a positive refractive index blend orientation angle is to tilt the refractive index interface within the medium of the lens to correspond more closely to the angle of gaze when a patient looks through that level of the lens, as shown in FIG. 7c. The orientation angle X may also consist of two angles, each corresponding to the instantaneous angle of gaze of the patient when looking through the two refractive index interfaces of a trifocal lens, as shown in FIG. 7d. It is also possible to achieve the desired refractive index blend orientation angle by combining a forward pitch of the lens with a tilt(s) of the refractive index interface(s) within the medium with the lens.

Although the visual disturbance resulting from an orientation angle not corresponding to the angle of gaze of the patient can never be completely avoided, as the pupil of the eye is not a point but rather covers an area averaging 4 mm in diameter in daytime viewing, nonetheless an improvement in vision may be achieved by optimizing the refractive index blend orientation angle. This is more important when the changing refractive index and refractive index blend comprises only the plus power portion of the lens (as specified in the present example), in which case the patient gazing straight ahead will be looking through the thickest portion of the changing refractive index portion, and less so when the changing refractive index portion comprises only the minus power portion of the lens, in which case the patient gazing straight ahead will be looking through the thinnest portion of the changing refractive index portion. A minus power changing refractive index embodiment as described is shown in FIG. 8.

Referring to FIG. 8 there is shown a second doublet lens configuration constructed following the teachings of this disclosure. Anterior lens section A comprises the changing refractive index layer and section B comprises the generally constant refractive index layer of the lens. Section A has minus power and section B has plus power. In the two examples provided the internal interface curvature R2 is concave with respect to section A. In this lens the refractive index of the distance vision portion is greater than that of the near vision portion, therefore providing add power for near vision.

With the example bifocal and trifocal lenses having been described and illustratively depicted in detail in the first embodiment, it should be understood that numerous multifocal designs may be provided by the present invention. Therefore only one changing refractive index profile, incorporating two portions of generally constant refractive index, will be referred to in this and further examples and embodiments, it being understood that the invention is not limited to bifocals or any other particular multifocal design.

Referring to FIG. 8, lens layer A is comprised of an optically transparent material having two portions with different refractive index values. A1 corresponds to the distance vision portion of the lens and has a refractive index value N1. A2 corresponds to the near vision portion of the lens and has a refractive index value N2. N1 and N2 are generally constant refractive index values. Dotted line 2 represents the refractive index blend interface of N1 and N2. Posterior lens layer B is comprised of an optically transparent material whose refractive index N3 is generally constant and which does not vary. Anterior surface 4 of lens layer A has a curvature with a radius value R1, internal interface I has a curvature R2, and posterior surface 5 of lens section B has a curvature with a radius value R3. The refractive index orientation angle of 8° as shown indicated by dotted line 2 is obtained by tilting the refractive index interface within the medium of the body of the lens.

As with the prior embodiment, values for R1, R2 and R3 are based on the lens providing 0 power in the distance vision portion and 2.5 diopters of add power in the near vision portion of the lens. In this and all subsequent lens examples the orientation angle of the refractive index blend will be designated OA. Exemplary Values for the parameters of 3 bifocal lenses according to this embodiment are as follows:

|  | Example #1 | Example #2 | Example #3 |
| --- | --- | --- | --- |
| N1 = | 1.70 | 1.74 | 1.74 |
| N2 = | 1.46 | 1.42 | 1.42 |
| N3 = | 1.66 | 1.74 | 1.74 |
| R1 = | 92.977 | 87.336 | 211.928 |
| R2 = | −47.508 | −52.101 | −80 |
| R3 = | −97.169 | −86.168 | −210.817 |
| CC = | 0155(a) | .0244(a) | −18.340(a) |
| OA = | 8° | 8° | 8° |
| CT = | 3.797 | 2.747 | 2.614 |
| ET = | 3.657 | 2.795 | 2.621 |
| CREN = | 21.051 | 15.332 | 15.538 |

Referring to FIG. 9 there is shown a doublet lens configuration of a third embodiment of the invention. Anterior lens section A comprises a generally constant refractive index layer, a right at the I are I in and lens section B comprises the changing refractive index layer of the lens. Section A has minus power and section B has plus power. In the two examples provided the internal interface curvature R2 is concave with respect to section A. In this embodiment the refractive index of the near vision portion is greater than that of the distance vision portion, therefore providing add power for near vision.

Using similar conventions for identifying and defining the lens as shown in the previously illustrated embodiments and examples, lens layer B is comprised of an optically transparent material having two portions with different refractive index values. B1 corresponds to the distance vision portion of the lens and has a refractive index value N1. B2 corresponds to the near vision portion of the lens and has a refractive index value N2. N1 and N2 are generally constant refractive index values. Dotted line 2 represents the refractive index blend interface of N1 and N2. Anterior lens layer A is comprised of an optically transparent material whose refractive index N3 is generally constant and which does not vary. Anterior surface 4 of lens layer A has a curvature with a radius value R1, internal interface I has a curvature R2, and posterior surface 5 of lens section B has a curvature with a radius value R3. The refractive index orientation angle of 8° as shown indicated by dotted line 2 is obtained by tilting the lens with respect to the angle of gaze of the patient.

Values for R1, R2 and R3 are based on the lens providing 0 power in the distance vision portion and 2.0 diopters of add power in the near vision portion of the lens.

|  | Example #1 | Example #2 |
|---|---|---|
| N1 = | 1.46 | 1.46 |
| N2 = | 1.70 | 1.70 |
| N3 = | 1.66 | 1.66 |
| R1 = | 80.226 | 188.049 |
| R2 = | −55.0 | −90.0 |
| R3 = | −99.163 | −355.981 |
| CC = | 0.085(p) | 68.383(p) |
| OA = | 8° | 8° |
| CT = | 2.879 | 2.738 |
| ET = | 2.154 | 2.010 |
| CREN = | 13.777 | 14.119 |

Referring to FIGS. 10a, 10b and 10c there are shown three doublet lens configurations of a fourth embodiment of the invention. Collectively, anterior lens section A comprises a generally constant refractive index section of the lens and section B comprises the changing refractive index section of the lens. Section A has plus power and section B has minus power. Anterior surface 4 of lens layer A has a curvature with a radius value R1, internal interface I has a curvature R2, and posterior surface 5 of lens section B has a curvature with a radius value R3. In this embodiment the refractive index of the distance vision portion is greater than that of the near vision portion, therefore providing add power for near vision.

Separately, FIG. 10a shows the embodiment wherein the internal interface curvature R2 is concave with respect to lens section A, FIG. 10b shows the embodiment wherein the internal interface curvature is plano, and FIG. 10c shows the embodiment wherein the internal interface curvature is convex with respect to lens section A.

Referring to FIG. 10b, bifocal lens layer B is comprised of an optically transparent material having two portions with different refractive index values. B1 corresponds to the distance vision portion of the lens and has a refractive index value N1. B2 corresponds to the near vision portion of the lens and has a refractive index value N2. N1 and N2 have generally constant refractive index values. Dotted line 2 represents the refractive index blend interface of N1 and N2, the orientation angle of which is achieved by tilting the lens 8° with respect to the angle of gaze of the patient. Anterior lens section A is comprised of an optically transparent material whose refractive index N3 is generally constant and which does not vary. Anterior surface 4 of lens section A has a curvature with a radius value R1, internal interface I has a curvature R2, and posterior surface 5 of lens section B has a curvature with a radius value R3. The lens of FIG. 10c has a combined 4° forward pitch of the lens and 4° tilt of the refractive index interface within the medium with the lens, thereby providing a total 8° orientation angle slope.

Relational values for R1, R2 and R3, representing example lenses illustratively depicted in FIGS. 10a, 10b and 10c, are listed below along with refractive index values. The three bifocal lens examples provide '0' power in the distance vision portion and 2.5 diopters of add power in the near vision portion of the lens.

|  | Example #1 | Example #2 | Example #3 |
|---|---|---|---|
| N1 = | 1.72 | 1.72 | 1.72 |
| N2 = | 1.44 | 1.44 | 1.44 |
| N3 = | 1.70 | 1.70 | 1.70 |
| R1 = | 89.637 | 108.921 | 237.809 |
| R2 = | −500.0 | plano | 200 |
| R3 = | −90.472 | −110.773 | −251.872 |
| CC = | 1.749(p) | 4.270(p) | 79.96(p) |
| OA = | 8° | 8° | 8° |
| CT = | 2.996 | 2.977 | 2.959 |
| ET = | 2.965 | 2.931 | 2.891 |
| CREN = | 8.209 | 18.208 | 18.175 |

Referring to FIGS. 11a and 11b there are shown two doublet lens configurations defining fifth and sixth embodiments of the invention. In these embodiments only one figure each, rather than three, will be used to illustrate the range of forms possible for each, it having been established through previous embodiments and examples that lenses with concave, plano and convex internal interface surfaces comprise the present invention. Collectively, both anterior lens section A and posterior lens section B comprise changing refractive index portions of the lens. By using a paired set of reverse profile changing refractive index layers in adjacent plus power and minus power sections the refractive index difference (RID) of each layer may be additively combined, resulting in a RID value well beyond what may be achieved by a single layer of changing refractive index, thereby providing a means of achieving high add values with lower or flatter curvatures and reducing lens thickness to a minimum, as will be seen in the following examples. In FIG. 11a, lens section A has plus power and lens section B has minus power. In lens section A the refractive index of the near vision portion is greater than that of the distance vision portion, and in lens section B the refractive index of the distance vision portion is greater than that of the near vision portion, therefore providing add power for near vision.

Lens layer A is comprised of an optically transparent material having two portions with different refractive index values. A1 corresponds to the distance vision portion of the lens and has a refractive index value N1. A2 corresponds to the near vision portion of the lens and has a refractive index value N2. N1 and N2 have generally constant refractive index values. Lens layer B is comprised of an optically transparent material having two portions with different refractive index values. B1 corresponds to the distance vision portion of the lens and has a refractive index value N3. B2 corresponds to the near vision portion of the lens and has a refractive index value N4. N3 and N4 have generally constant refractive index values. In the figure the refractive index blends 2 and 3 of lens section A and lens section B respectively are aligned to provide cooperating and aligned distance and near vision portions of the lens. By alignment is meant that the surfaces defining the orientation angles of two refractive index blends corresponding to like-portion interfaces generally coincide. The refractive index blend orientation angle of the example lenses is 8°, produced by tilting the refractive index interface within the medium of the body of the lens. Anterior surface 4 of lens section A has a curvature with a radius value R1, internal interface I has a curvature R2, and posterior surface 5 of lens section B has a curvature with a radius value R3. Relational values for R1, R2 and R3, representing example lenses with concave, plano and convex internal interface curvatures are listed below along with the associated CREN values, refractive indices, lens thicknesses and optional conic constant values. The three lens examples provide '0' power in the distance vision portion and 2.5 diopters of add power in the near vision portion of the lens.

|        | Example #1 | Example #2 | Example #3 |
|--------|------------|------------|------------|
| N1 =   | 1.44       | 1.44       | 1.44       |
| N2 =   | 1.70       | 1.70       | 1.70       |
| N3 =   | 1.70       | 1.70       | 1.70       |
| N4 =   | 1.44       | 1.44       | 1.44       |
| R1 =   | 92.184     | 169.531    | 293.392    |
| R2 =   | −200.0     | plano      | 400.00     |
| R3 =   | −114.624   | −268.752   | −821.066   |
| CC =   | −.605(a)   | −10.031(a) | −75.316(a) |
| CT =   | 2.034      | 2.007      | 2.004      |
| ET =   | 1.395      | 1.374      | 1.371      |
| CREN = | 9.573      | 9.619      | 9.626      |

Three additional lens examples shown below provide '0' power in the distance vision portion and 3.5 diopters of add power in the near vision portion of the lens.

|        | Example #1 | Example #2 | Example #3 |
|--------|------------|------------|------------|
| N1 =   | 1.42       | 1.42       | 1.42       |
| N2 =   | 1.74       | 1.74       | 1.74       |
| N3 =   | 1.74       | 1.74       | 1.74       |
| N4 =   | 1.42       | 1.42       | 1.42       |
| R1 =   | 84.012     | 143.482    | 223.017    |
| R2 =   | −200.0     | plano      | 400.00     |
| R3 =   | −111.396   | −251.616   | −679.771   |
| CC =   | −.417(a)   | −6.746(a)  | −37.295(a) |
| CT =   | 2.356      | 2.321      | 2.316      |
| ET =   | 1.471      | 1.447      | 1.444      |
| CREN = | 10.880     | 10.944     | 10.955     |

Referring to FIG. 11b, section A has minus power and section B has plus power. In lens section A the refractive index of the distance vision portion is greater than that of the near vision portion, and in lens section B the refractive index of the near vision portion is greater than that of the distance vision portion, therefore providing add power for near vision.

Lens layer A is comprised of an optically transparent material having two portions with different refractive index values. A1 corresponds to the distance vision portion of the lens and has a refractive index value N1. A2 corresponds to the intermediate and near vision portions of the lens and has a refractive index value N2. The refractive index values N1 and N2 are generally constant. Lens layer B is comprised of an optically transparent material having two portions with different refractive index values. B1 corresponds to the distance and intermediate vision portions of the lens and has a refractive index value N3. B2 corresponds to the near vision portion of the lens and has a refractive index value N4. N3 and N4 have generally constant refractive index values. In FIG. 11b the refractive index blends 2 and 3 of lens section A and lens section B respectively are misaligned to provide an area of intermediate vision between the two refractive index blends. By misalignment is meant that the planes defining the orientation angles of two refractive index blends corresponding to like-portion interfaces do not coincide and are parallel or intersect in a line. Refractive index blends of adjacent lens sections may be misaligned such that any one refractive index blend is displaced either above or below the level of a refractive index blend of the adjacent section. In FIG. 11b the refractive index blend 3 of lens section B is displaced below the refractive index blend 2 of lens section A by 7 mm, thereby providing an intermediate vision area with a 7 mm vertical extent.

The orientation angle for each refractive index blend interface of the example lenses is 8°, produced by a forward pitch of the lens as previously described. Anterior surface 4 of lens section A has a curvature with a radius value R1, internal interface I has a curvature R2, and posterior surface 5 of lens section B has a curvature with a radius value R3. Relational values for R1, R2 and R3, representing example lenses with concave, plano and convex internal interface curvatures are listed below along with the associated CREN values, refractive indices, lens thicknesses and optional conic constant values. The three lens examples provide '0' power in the distance vision portion and 3.0 diopters of add power in the near vision portion of the lens.

|        | Example #1  | Example #2  | Example #3  |
|--------|-------------|-------------|-------------|
| N1 =   | 1.74        | 1.74        | 1.74        |
| N2 =   | 1.42        | 1.42        | 1.42        |
| N3 =   | 1.42        | 1.42        | 1.42        |
| N4 =   | 1.74        | 1.74        | 1.74        |
| R1 =   | 305.623     | 175.404     | 91.656      |
| R2 =   | −150        | −110.0      | −70.0       |
| R3 =   | −1453.788   | −319.516    | −119.057    |
| CC =   | −139.810(a) | −16.698(a)  | −.5941(a)   |
| CT =   | 2.034       | 2.047       | 2.099       |
| ET =   | 1.289       | 1.300       | 1.345       |
| CREN = | 9.373       | 9.351       | 9.262       |

Referring to FIGS. 12a and 12b, there are shown two triplet lens configurations illustrating sixth and seventh types of lenses that can be made following the teachings of the present disclosure. Again for these lenses only one Figure each, rather than three, will be used to illustrate the range of forms possible for each. The lenses have the same defining characteristics of the lenses described in connection with FIGS. 11a and 11b, wherein both anterior lens section A and posterior lens section B comprise changing refractive index portions of the lens. Additionally the lenses shown in FIGS. 12a and 12b incorporate a third bonded lens layer C on which to provide a patient's prescription. Posterior lens section C (FIGS. 12a and 12b) comprises an optically transparent material whose refractive index N5 is generally constant and which does not vary.

In FIG. 12a, lens section C is positioned adjacent lens section B and is therefore the posterior-most layer of the lens. In FIG. 12b, lens section C is positioned adjacent lens section A, and is therefore the anterior-most layer of the lens. In both embodiments lens section C may be positioned adjacent either lens section A or lens section B. In lens blank form the lens may be formed with lens section C thick enough to allow a wide range of patient prescriptions to be processed into the finished lens. Final center thickness of lens section C may be as low as 0.25 mm. Relational values for R1, R2, R3, and R4 for the two embodiments representing example lenses with various internal interface curvatures R2 are listed below along with the associated CREN values, refractive indices, lens thicknesses and optional conic constant values. The equation to determine the CREN number has been modified to include values corresponding to the additional lens layer C, and is expressed in surface diopters as follows:

$$D1+2-D2+D3+(D3-D4)=CREN$$

wherein D1, D3 and D4 are the absolute values of the surface diopters of R1, R3 and R4 respectively, and the sign of D2, which is the surface diopter power of R2, is positive when its curvature is convex with respect to lens section A and negative when its curvature is concave with respect to lens section A. (D3-D4) is an unsigned value.

To provide a lens with minimum bulk or 'gross sag' and maximum CREN efficiency, it is important that both lens portions A and B share more or less equally in providing the add power(s) of the lens. It is also possible to slightly increase the CREN and optical performance efficiency of the lens by increasing the thickness of lens section C to a value greater than the 0.25 mm center thickness listed above. By so doing some of the lens curvatures flatten slightly, although overall thickness of the lens is increased, so there is a trade off of sorts. To provide improved optical performance, increase the CREN efficiency and to minimize lens thickness and bulk a center thickness for lens section C may optimally be between 0.25 and 1.0 mm. With patient prescriptions requiring plus power in the distance portion of the lens, center thickness of lens section C may exceed 1 mm. Conversely, with patient prescriptions requiring minus power in the distance portion of the lens, edge thickness of lens section C and of the entire lens will increase. In the example lenses below a center thickness of 0.5 mm has been selected for lens section C. Additionally, for convenience and to provide a range of patient prescriptions that will allow a thin lens section C to be utilized, an R4 value for lens section C equal to the R3 value of lens section B, when section C is adjacent section B, and equal to the R1 value of lens section A, when section C is adjacent section A, is used in the examples below.

As portions A and B are opposite in both power sign and changing refractive index profile orientation, the opportunity exists to increase, up to double, the refractive index difference or RID value of the lens by approximately a 50% power sharing of the two portions. It is possible to shift the function percentage between the portions and still maintain excellent optical quality, but in so doing both gross sag of the lens and the CREN are increased. The percentage shift may favor either lens section A or lens section B. For example, a shift in favor of lens section A would result in an increase in the surface diopter power and center thickness of lens section A and a decrease in the surface power and edge thickness of lens section B. The percentage shift can be partial or even equal 100%, in which case lens section A will be doing all the work, and be quite a bit steeper, and lens section B will essentially become a plano lens, contributing nothing to the add function of the lens. In this case the lens is essentially the same as the lens described above which has only one section comprising the changing refractive index portion of the lens. It should therefore be understood that lenses illustrated in FIGS. 11 and 12 may have CREN numbers ranging from a maximum efficiency value, resulting from the optimal sharing and combining of both add generating lens portions A and B, to approximately that of a lens with only one section incorporating a changing refractive index. In the example lens parameters of 12a below, the CREN value in parenthesis represents the CREN value when section A is providing 100% of the add power and section B provides none, and in the example lenses of 12b, the CREN value in parenthesis represents the CREN value when section B is providing 100% of the add power and section A provides none. The CREN value for each lens example may range between these two values based on the percentage each portion contributes to the add power of the lens. The lenses provide '0' power in the distance vision portion and 3.5 diopters of add power in the near vision portion of the lens.

| | Lens 12a | | |
|---|---|---|---|
| | Example #1 | Example #2 | Example #3 |
| N1 = | 1.46 | 1.46 | 1.46 |
| N2 = | 1.70 | 1.70 | 1.70 |
| N3 = | 1.70 | 1.70 | 1.70 |
| N4 = | 1.46 | 1.46 | 1.46 |
| N5 = | 1.66 | 1.66 | 1.66 |
| R1 = | 89.131 | 114.045 | 262.062 |
| R2 = | −400.00 | plano | 200.00 |
| R3 = | −120.208 | −172.008 | −1247.917 |
| R4 = | −120.208 | −172.008 | −1247.917 |
| CC = | −.122(a) | −.461(a) | −47.467(a) |
| CT = | 3.371 | 3.354 | 3.346 |
| ET = | 2.500 | 2.483 | 2.476 |
| CREN = | 14.538(to 24.48) | 14.582(to 24.65) | 14.617(to 24.84) |

| | Lens 12b | | |
|---|---|---|---|
| | Example #1 | Example #2 | Example #3 |
| N1 = | 1.42 | 1.42 | 1.42 |
| N2 = | 1.74 | 1.74 | 1.74 |
| N3 = | 1.74 | 1.74 | 1.74 |
| N4 = | 1.42 | 1.42 | 1.42 |
| N5 = | 1.70 | 1.70 | 1.70 |
| R1 = | 96.833 | 195.042 | 331.492 |
| R2 = | −70.0 | −110 | −143.2176 |
| R3 = | −135.095 | −470.854 | plano |
| R4 = | 96.833 | 195.042 | 331.492 |
| CC = | .45(p) | 77.372(p) | −85.810(a) |
| CT = | 2.894 | 2.838 | 2.825 |
| ET = | 2.022 | 1.968 | 1.955 |
| CREN = | 10.842(to 17.41) | 10.931(to 17.54) | 10.948(to 17.56) |

Referring to FIGS. 13 through 18 there are shown further examples following the teachings of this disclosure. These Figures show multi-layered Fresnel lenses incorporating changing refractive index. As previously stated, a Fresnel lens surface comprises numerous discontinuous coaxial annular sections each defining a slope corresponding to a continuous lens surface geometry, collapsed to form a surface of lower profile. Joining each optically functional annular section is a non-optically functional step, also in the form of an annulus, that in conjunction with the refracting surfaces determines the overall geometry and lens thickness.

Fresnel lenses typically are not used in ophthalmic lens applications as the imaging quality of such lenses is generally considered poor. Not only is there image jump if the lens surface is not produced to exceedingly high levels of accuracy, but also the efficiency of the lens is poor especially for increasing angles of gaze or obliquity of light rays. Poor efficiency results when light rays that otherwise would enter the eye are obstructed by the non-optically functional steps whose angular orientation do not correspond to the light ray pathways. The light loss is most pronounced in the periphery of the lens and can affect vision through the upper distance vision, lateral and lower near vision portions of the lens. Furthermore there is light loss due to diffraction, scattering and reflectance from the textured surface, and of course, there is for some the cosmetic concern of wearing lenses that look like transparent Victrola records.

Three steps can be taken to dramatically improve the performance and appearance of a Fresnel lens by following the teachings of this disclosure so that it may be used in an ophthalmic application. Firstly, each annulus comprising a non-optically functional step may be oriented at an angle substantially equal to that of the light rays passing through that point on the lens from points in the field corresponding to the line of sight of the patient and proceeding to the patient's eye. The question arises as to what point should be selected as the exit pupil. There are two primary locations to consider, one being the location of the eye pupil when the patient is looking straight forward through the center of the lens, and the other is the center of rotation of the eye, which is the location that may be considered the "exit" pupil when the patient is looking through the various peripheral portions of the lens. If the location of the eye pupil when the patient is looking straight forward is used to determine the slope of the non-optically functional steps, while it is true that objects seen in the peripheral field will have good contrast and clarity when looking straight forward, when the eye gazes to look at objects through the left, right or lower reading portion of the lens there will be some degradation of peripheral vision resulting from obstruction of light rays by the steps. Conversely, if the center of rotation of the eye is used to determine the slope of the non-optically functional steps, while it is true that objects seen in the patient's peripheral field will have good contrast and clarity when gazing at an angle through the left, right or lower near vision portion of the lens, when the eye looks straight forward to view an object in the central portion of the lens, there will be some degradation of peripheral vision resulting from obstruction of light rays by the steps.

When the patient looks straight ahead the pupil is located approximately 16 mm behind the back surface of the spectacle lens, whereas the center of rotation of the eye is approximately 28.5 mm behind the back surface of the spectacle lens. Either location, or any point in between may be used to determine the slope angles of the steps and excellent results would be achieved. Furthermore, improved results may be achieved by selecting any point posterior of the lens greater than about 15 mm as the location defining an exit pupil. A distance of 21 mm from the back surface of the lens for the location of the exit pupil results in an approximately equal angular error of the non-optical step of about 8° for the two extremes of the eye orientation stated with reference to peripheral rays directed to that location. The slope of each step may equal the angle of refracted rays passing through the lens at the location of the step and proceeding from the lens to the exit pupil. Each step may be visualized as one of a series of annular right circular concentric conical sections formed by the intersection of conical surfaces and the lens body, as the conical surfaces, following at least to some degree the pathway of the refracted light rays proceeding through the lens, form their apices at the 21 mm distance mentioned or other distances posterior of the back surface of the lens.

The second step that may be taken to improve the Fresnel lens performance by following the teachings of this disclosure is to bond an adjacent lens layer to the Fresnel surface of a fresnel preform as a cast layer where the cast layer is formed, e.g., as is layer A in FIG. 1b. This may limit or eliminate entirely Fresnel diffraction and reflection of one portion, either the upper distance or lower near vision portion, and substantially reducing diffraction and reflection in the other portion, while providing protection of the vulnerable Fresnel geometry. When the refractive index of the bonded portion is equal to that of the Fresnel preform, the function of the Fresnel as well as its visibility and any resulting visual degradation are completely eliminated. Such an area of the doublet Fresnel lens will act as a single refractive index optical window and is ideal for the distance vision portion of the lens.

Third, by using a high-power Fresnel preform of either plus or minus power, for example 20 diopters, the refractive index of the bonded portion providing add power may be somewhat close to that of the preform. The higher the power, the less refractive index difference there need be. The refractive index of the bonded add portion may be greater or lesser than that of the preform, yielding a plus or minus power, depending on whether the Fresnel preform is positive or negative in power. The use of a high power Fresnel preform with a bonded add portion comprising a refractive index somewhat close to that of the Fresnel preform provides an advantage in that diffraction, light scattering, reflectance, surface geometry and any surface error or damage may be visibly reduced.

Figures 13, 14:
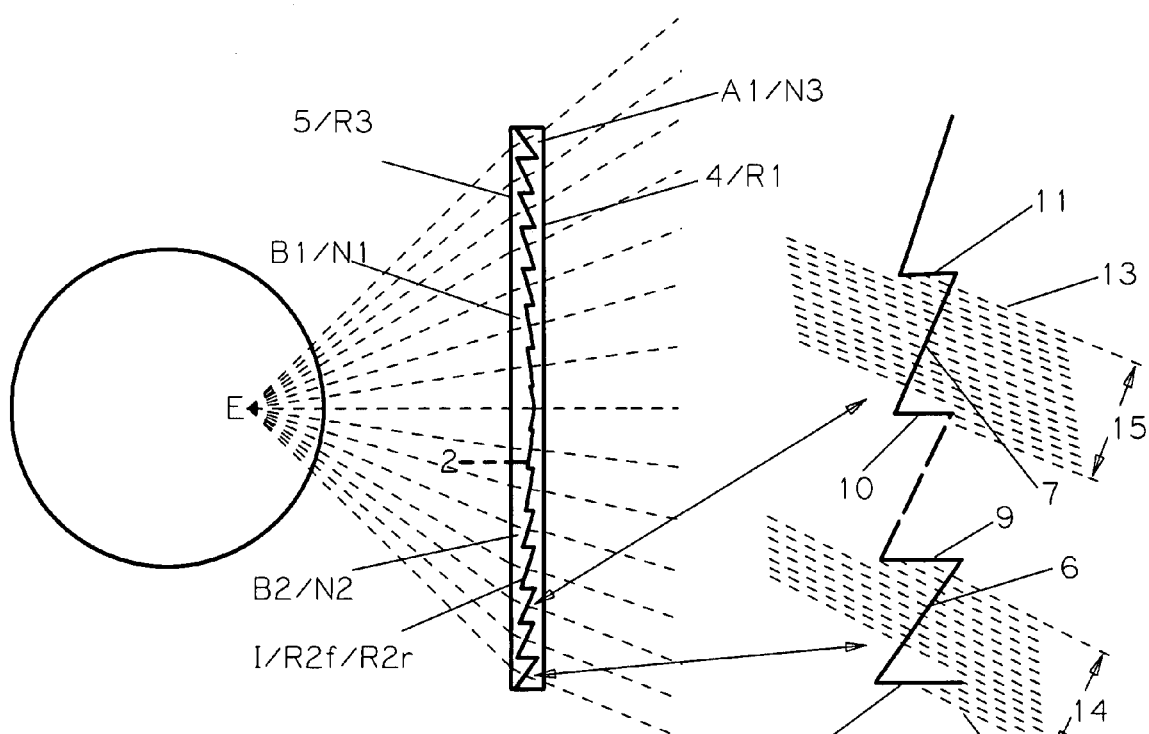
FIG. 13 is an illustrative side view of a multifocal spectacle lens incorporating a changing refractive index in the form of a doublet Fresnel lens.
FIG. 14 illustrates the light pathways through a peripheral region of the Fresnel lens of FIG. 13.

Referring to FIG. 13 there is shown a doublet Fresnel lens configuration defining an eighth lens made following the teachings of this disclosure. In the lens shown in Figure the non-optically functional steps are normal to the form of the lens, and do not correspond to the described exit pupil. In the figure, lens section A comprises the generally constant refractive index section of the lens and lens section B comprises the changing refractive index section of the lens. Separately, section A has minus power and section B has plus power. In this embodiment the refractive index of the distance vision portion of lens section B is less than that of the near vision portion, therefore providing add power for near vision.

There is no refractive index orientation angle as the thickness of lens section B is minimal and therefore the thickness of the refractive index blend represented by dotted line 2 is also minimal, on the order of 0.4 mm. Furthermore, as the curvature, or may be more appropriately stated, the 'form' of the Fresnel surface is independent of the power of the Fresnel lens, CREN values will be low or zero unless the air boundary surfaces depart significantly from the diopter curvature form or shape of the Fresnel, or if there isn't cancellation of one of the Fresnel surfaces areas by an adjacent layer portion with an identical refractive index. In these cases plus or minus power supplied by one or both of the air boundary surfaces will be required to correct the lens to the '0' power for distance standard. For Fresnel lenses of the present embodiment the CREN equation is modified to the following:

$$1000/R1 - 2 \cdot 1000/R2 + 1000/R3 = CREN$$

wherein R1, R2 and R3 are the absolute values of the surface radii, and R2 is the diopter curvature form (R2f) of the Fresnel, independent of its actual surface power. For a lens in which the refractive index of one layer portion of a changing refractive index section, for example the distance vision portion, is identical to the Fresnel preform it is bonded to, no corrective curvatures will be required on R1 and R3, and as such they may 'parallel' the contour or form of R2, whether R2 is flat or curved. In this case the CREN value ends up at '0', as shown in the substituted equation when R1, R3 and R2 are 250 mm:

$$4 - 8 + 4 = 0$$

When R1 and R3 do not parallel R2, for example when R2 is flat and R1 is 333 mm and R3 is −333 mm, the CREN value is 6, indicating some bulk or gross sag to the lens. CREN values for the Fresnel lens of the present invention generally range from 0 to 20, and are listed with the associated lens parameters for four example Fresnel lenses.

Referring to FIG. 13, lens layer B is comprised of an optically transparent material having two portions with different refractive index values. B1 corresponds to the distance vision portion of the lens and has a refractive index value N1. B2 corresponds to the near vision portion of the lens and has a refractive index value N2. N1 and N2 are generally constant refractive index values. Dotted line 2 represents the refractive index blend interface of N1 and N2. Anterior lens layer A is a Fresnel perform lens comprised of an optically transparent material whose refractive index N3 is generally constant. Anterior surface 4 of lens layer A has a curvature R1 which is plano, internal Fresnel interface I has a form R2f, which is generally flat, an equivalent Fresnel radius R2r with respect to lens section A and a conic constant value CC, and posterior surface 5 of lens section B has a curvature R3 which is plano.

The lens provides '0' power in the distance vision portion and a high diopter add power in the near vision portion of the four exemplary lenses, listed below. Surface 4 may be modified to incorporate a patient's prescription or both surfaces 4 and 5 may be modified to provide a meniscus curvature form.

Values for four example lenses are as follows:

|  | Example #1 | Example #2 | Example #3 | Example #4 |
|---|---|---|---|---|
| N1 = | 1.491 | 1.498 | 1.498 | 1.498 |
| N2 = | 1.58 | 1.58 | 1.56 | 1.55 |
| N3 = | 1.491 | 1.498 | 1.498 | 1.498 |
| R1 = | plano | plano | plano | plano |
| R2f = | flat | flat | flat | flat |
| R2r = | −24.68 | −24.68 | −24.68 | −24.68 |
| CC = | −.631 | −.631 | −.631 | −.631 |
| R3 = | plano | plano | plano | plano |
| CT = | 2 | 2 | 2 | 2 |
| ET = | 2 | 2 | 2 | 2 |
| CREN = | 0 | 0 | 0 | 0 |
| Add = | 3.5 diopters | 3.265 | 2.455 | 2.05 |

For the above Fresnel lens examples point E, located approximately 21 mm behind lens surface 5, has been selected as the exit pupil, and even though the Fresnel geometry is not corrected by a corresponding angling of the Fresnel steps, this point still is a valid reference for determining the efficiency of an uncorrected geometry Fresnel.

FIG. 14 is an enlargement of two optically functional slopes 6 and 7 along with interconnecting non-optically functional steps 8, 9 and 10, 11 of internal Fresnel interface R2r of FIG. 13, indicated by the arrows. Light rays bundles 12 and 13, shown at predetermined diameters 14 and 15 respectively, both proceed through the lens and are refracted to the exit pupil E, hence the two slightly different angles. As can be seen from the illustration, a significant amount of the bundles 12 and 13 is clipped or obstructed by steps 8, 9 and 10, 11 and as a result the lens is quite inefficient in its periphery.

Lens example #1 in the immediately preceding example comprises a Fresnel preform A with a negative focal length of 50 mm, refractive index N3 of 1.491, Fresnel radius R2r of −24.68 mm, and conic constant of −0.631, combined with a 0.4 mm thick cast Fresnel layer B comprising an N1 refractive index of 1.491 and an N2 refractive index of 1.58. The lens provides 3.5 diopters of add power. Two rays are selected at peripheral angles of 35° and 45° degrees directed to the above-described exit pupil. At the location the refracted 45° ray bundle passes through a single internal Fresnel interface annulus, the surface slope is 44.67° and has a calculated step depth of 0.25095 nm over a selected groove width of 0.254 mm. At the location the refracted 35° ray bundle passes through the internal Fresnel interface annulus the surface slope is 32.51° and has a calculated step depth of 0.16210 mm over the groove width of 0.254 mm. The 450 ray is refracted from an internal ray angle of 26.59°, and the 35° ray is refracted from an internal ray angle of 21.29°. The 26.59° ray shows losses from interference of the 0.25095 mm tall (outer) step annulus resulting in 49.5% light reduction and the 35° ray shows losses from interference of the 0.16210 mm tall (outer) step annulus resulting in a 25% light reduction. There will be negligible light loss through the portion where the refractive indices of lens section A and lens section B are the same, that I, in this case where both have a refractive index of 1.491, as the surface geometry of the Fresnel interface becomes invisible. It is the step angles of the near vision portion, where there is a refractive index difference of 0.089, that should be corrected. Furthermore, to avoid or minimize chromatic aberration, optical materials with similar Abbe values should be selected, or materials with compensating Abbe characteristics may be selected to correct chromatic aberration.

Figures 15, 16:
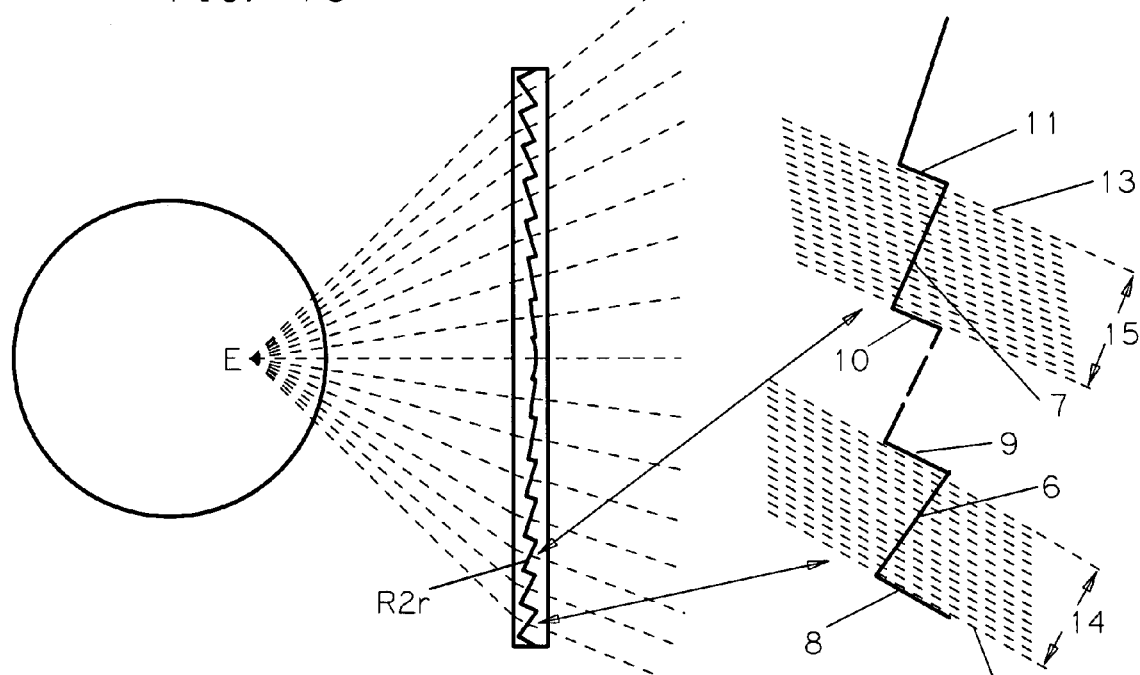
FIG. 15 is an illustrative side view of a multifocal spectacle lens incorporating a changing refractive index in the form of an optimized doublet Fresnel lens.
FIG. 16 illustrates the light pathways through a peripheral region of the Fresnel lens of FIG. 15.

FIG. 15 shows a doublet Fresnel lens configuration of a ninth exemplary lens constructed following the teachings of this disclosure. It is ion identical to the Fresnel lens of FIG. 13 except that the annular step slopes have been corrected as described to minimize obstruction of light rays especially through the periphery of the lens. The surface radii, refractive indices, lens section powers, thickness and add power of the lens are the same as listed for the example #1 lens relating to FIG. 13.

FIG. 16 is an enlargement of two optically functional slopes 6 and 7 along with interconnecting non-optically functional steps 8, 9 and 10, 11 of internal Fresnel interface R2r of FIG. 15, indicated by the arrows. Light rays bundles 12 and 13, shown at the same dimensions 14 and 15 as in FIG. 14, both proceed through the lens and are refracted to the exit pupil E. As can be seen from the illustration, there is no clipping or obstruction of the bundles by steps 8, 9 and 10, 111 at the Fresnel interface. As a result there is minimal light loss and the lens is quite efficient in its periphery, providing high contrast, bright and clear visualization of objects in the lateral peripheral field and through the near vision portion of the lens. As mentioned the annular Fresnel steps have been optimized for an exit pupil location E 21 mm behind the back surface of the spectacle lens, thereby resulting in only slight obstruction of light rays for both straight ahead and peripherally directed gazing by the patient.

In the prior Fresnel lens examples the internal Fresnel interface surface I is generally flat as is typical of most commercially available Fresnel lenses, but the form of the lens may be other than flat, for example, surfaces R1 and R3 may be curved in meniscus form to resemble a standard ophthalmic lens. In this case the lens thickness will increase as a result of increased center thickness of section A and increased edge thickness of section B. By using low diopter curvatures, the thickness increase will be within reasonable limits.

Figure 17:
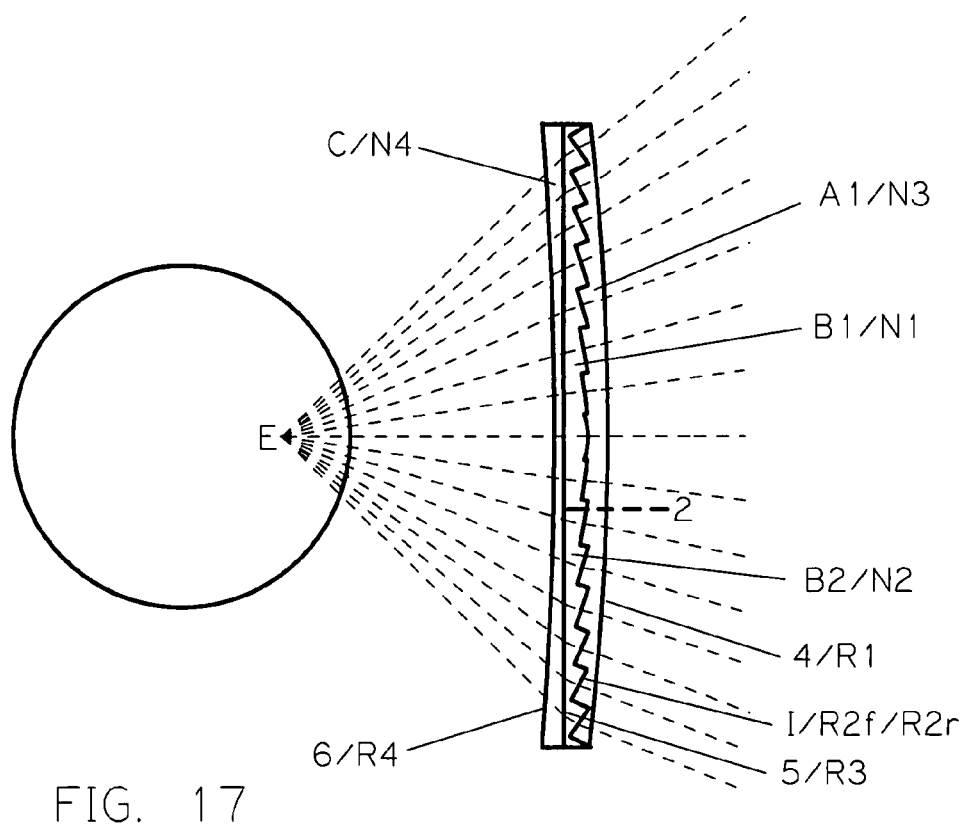
FIG. 17 is an illustrative side view of a multifocal spectacle lens incorporating a changing refractive index in the form of an optimized triplet Fresnel lens in which the form of the lens is curved about the patient's eye.

FIG. 17 shows a tenth exemplary lens constructed following the teachings of this disclosure. This lens, as shown in FIG. 17, is similar to that described in connection with FIG. 15, but it incorporates a third bonded lens layer C forming a triplet Fresnel lens. In FIG. 17 internal Fresnel interface surface I is generally flat and the form of the lens as above described is meniscus and resembles a standard ophthalmic lens. The lens may incorporate non-optically functional steps which are normal to the plane of the lens in the manner of FIG. 13 or which are angled and corrected in the manner of FIG. 15 accordance, both of which have been described above.

In FIG. 17, lens section A comprises a Fresnel preform of generally constant refractive index, lens section B comprises the changing refractive index section of the lens, and lens section C comprises a $2^{nd}$ preform. Separately, section A has minus power, section B has plus power, and section C has minus power. In this embodiment the refractive index of the distance vision portion of lens section B is less than that of the near vision portion, therefore providing add power for near vision.

As with the prior Fresnel lens examples described in connection with FIGS. 13-16, there is no refractive index orientation angle as the thickness of lens section B is minimal and therefore the thickness of the refractive index blend represented by dotted line 2 is also minimal, on the order of 0.35 mm. Lens layer B has two portions with different refractive index values and functions as an optical cement between lens layers A and C. B1 corresponds to the distance vision portion of the lens and has a refractive index value N1. B2 corresponds to the near vision portion of the lens and has a refractive index value N2. N1 and N2 are generally constant refractive index values. Dotted line 2 represents the refractive index blend interface of N1 and N2. Anterior lens layer A is a Fresnel preform lens comprising an optically transparent material whose refractive index N3 is generally constant. Posterior lens layer C is a preform lens with a refractive index N4. Internal surface 5 of lens section C has a curvature R3 which may be flat or just slightly convex with respect to lens section C in order to facilitate an air bubble free bond in conjunction with the changing refractive index of section B. Anterior surface 4 of lens layer A has a curvature R1 which is convex, internal Fresnel interface I has a form R2f, which is generally flat, an equivalent Fresnel radius R2r with respect to lens section A and a conic constant value CC, and posterior surface 6 of lens section C has a curvature R4 which is concave. Surface 4 or 6 may be modified to incorporate a patient's prescription. The 3 diopter convex curvature of surface 4 and concave curvature of surface 6 provide a meniscus lens form typical of ophthalmic lenses. Center and edge thicknesses in a 50 mm diameter lens having the following parameters are well within reasonable limits for an ophthalmic lens and are listed below. The lens provides '0' power in the distance vision portion and 3.265 diopters of add power in the near vision portion of the lens. Higher refractive index preforms will result in a significantly thinner lens, allowing for higher curvatures for surfaces 4 and 6.

N1=1.498

N2=1.58

N3=1.498

N4=1.498

R1=333.333

R2f=flat

R2r=−24.68

CC=−0.631

R3=flat

R4=−332.821

CT=1.54

ET=1.54

CREN=6.005

The above Fresnel lens examples may be produced with either or both sections comprising the changing refractive index sections of the lens as with the previous embodiments of this writing, although it is preferred that only one section comprise a changing refractive index profile for a bifocal version of the Fresnel lens. A trifocal lens may comprise one layer with two refractive index blends, wherein each portion with discrete power provides vision for corresponding vision zones, also as previously illustrated. Alternatively, an embodiment similar to the fifth and sixth embodiments wherein both sections comprise a changing refractive index, and the refractive index blend interfaces are misaligned may provide three discrete power portions for corresponding vision zones. The Fresnel preform may have either plus or minus power and be positioned as either the anterior or posterior lens layer. The refractive index of one portion of the changing refractive index layer may be the same as or different than its counterpart of the adjacent bonded layer. Also as shown, the inner Fresnel surface may typically be flat with the overall form of the lens being either flat or curved.

Figures 18, 18A:
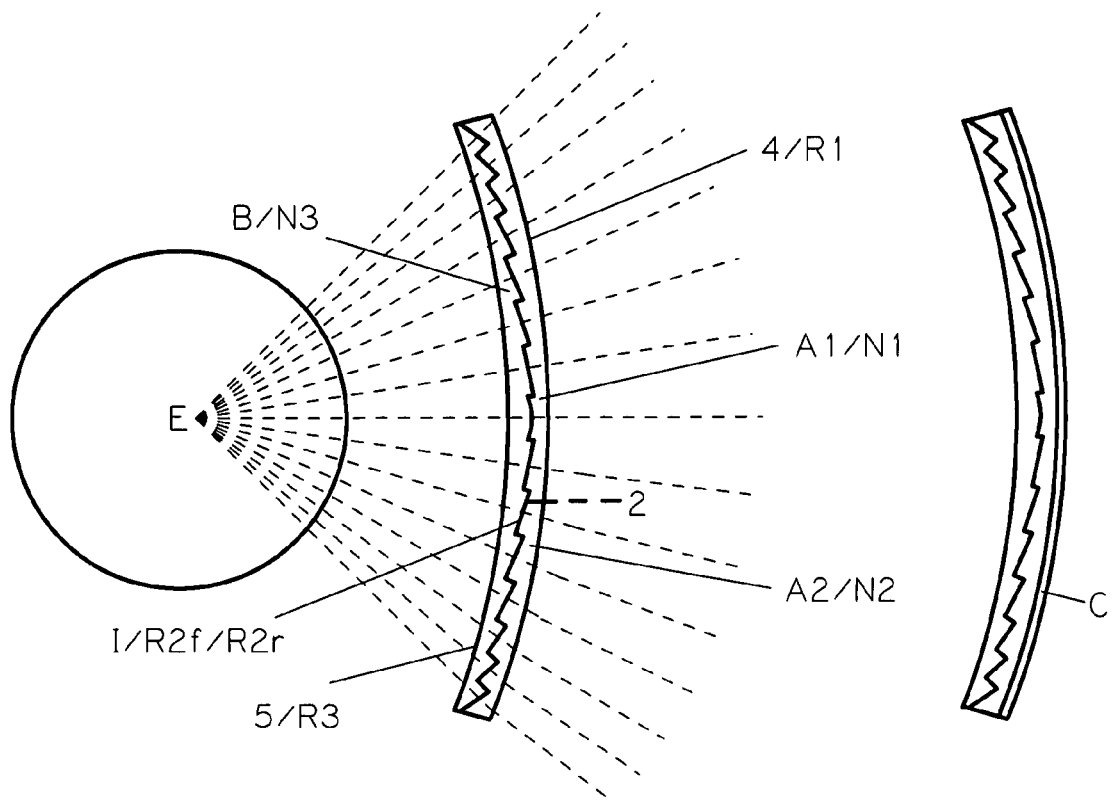
FIG. 18 is an illustrative side view of a multifocal spectacle lens incorporating a changing refractive index in the form of an optimized doublet Fresnel lens in which the form of the Fresnel lens is curved about the patient's eye.
FIG. 18a shows the lens of FIG. 18 with a protective layer.

Referring to FIG. 18, there is shown a doublet Fresnel lens configuration of an eleventh exemplary lens constructed according to the teachings of this disclosure. The lens_ in FIG. 18 incorporates a curved internal Fresnel surface R2, as well as curved surfaces R1 and R3. In this embodiment the Fresnel lens form incorporates a corrected geometry of the non-optically functional step as previously described in addition to a curved surface R2 that allows a meniscus form to be used without an increased CREN value and added thickness of the lens. In other words the curvature of R2 may approximate that of R1 or R3. R2 in conjunction with R1 and R3 may also provide a more highly curved lens such that the pathways of the light rays within the body of the lens are substantially perpendicular to the Fresnel form and therefore the non-optically functional steps are as well normal to the Fresnel form. This occurs when the radius of posterior surface 5 is approximately equal to the distance to the exit pupil. This translates to a curvature of 47.6 diopters, which by most standards would be excessively steep for an ophthalmic lens. Therefore it is preferred that the curvature R2 be reduced to a value typical of base curves of standard ophthalmic lenses, for example 200 mm (5 diopter curve) and the step angles be corrected accordingly. In the FIG. 18 lens the exit pupil E is located 28.5 mm behind the back surface of the spectacle lens. Section A comprises a changing refractive index section of the lens and section B comprises the generally constant refractive index section of the lens. Separately, section A has minus power and section B has plus power. In this embodiment the refractive index of the distance vision portion of section A is greater than that of the near vision portion, therefore providing add power for near vision.

Referring to FIG. 18, lens layer A is comprised of an optically transparent material having two portions with different refractive index values. A1 corresponds to the distance vision portion of the lens and has a refractive index value N1. A2 corresponds to the near vision portion of the lens and has a refractive index value N2. N1 and N2 are generally constant refractive index values. Dotted line 2 represents the refractive index blend interface of N1 and N2. Posterior lens layer B is a Fresnel preform lens comprised of an optically transparent material whose refractive index N3 is generally constant. Anterior surface 4 of lens layer A has a curvature R1 which is convex, internal Fresnel interface I has a form R2f which is concave and an equivalent Fresnel radius R2r with respect to lens section A and a conic constant value CC, and posterior surface 5 of lens section B has a curvature R3 which is concave.

The lens provides '0' power in the distance vision portion and 2.278 diopters of add power in the near vision portion of the lens. Surface 5 may be modified to incorporate a patient's prescription.

Values for an example lens are as follows:

N1=1.55

N2=1.498

N3=1.55

R1=200.0

R2f=200.0

R2r=−22.21

CC=−0.699

R3=−199.47

CT=1.5

ET=1.5

CREN=0.013

The changing refractive index portion of the above-described flat-form Fresnel lenses of FIGS. 13, 15 and 17 may be produced using the spraying method previously described. In this method two spray guns S1 & S2 (FIG. 20) move together in a linear or arcuate path each spraying a deposit of one of the refractive index resins onto the Fresnel preform surface in such a manner as to produce an overlapping or common deposit 0.2 to 2 mm wide or greater across the extent of the lens. A thin vertical separator wall positioned between the spray guns and oriented in line with the direction of their movement, just above the pooling resin deposits, separates the distance and near vision portions and blocks unwanted spray from each gun from depositing in the adjacent portion while controlling an amount of each sprayed resin that passes underneath and beyond it to mix with the adjacent sprayed resin portion. The extent of the overlap or blend area may be increased or decreased and easily controlled by the height of the wall and the direction and pattern of spray of the guns. The spray process may continue as the guns continue their back and forth linear or arcuate motion, insuring an even distribution and volume of resin material is deposited over the Fresnel lens surface.

The spraying process further insures that thorough mixing of the two resins occurs in the blend area by the massaging and mixing action of the existing pooled deposit caused by the impact of both the resin mist and air pressure of the spray guns. Once a depth of sprayed deposit is achieved somewhat above the level of the filled voids of the Fresnel surface, the lens may be fully cured or polymerized and subsequently machined or processed as desired, or a protective layer or additional section, such as lens section C of FIG. 17 or 18*a*, may be applied to the liquid resin surface and polymerized, creating a permanently bonded section. Alternatively a removable casting member may be applied to the upper most resin surface followed by polymerization and subsequent removal to create an optical quality surface such as 5 indicated in FIG. 13.

The changing refractive index section of the above-described curved form doublet Fresnel lens of FIG. 18 may be produced in a similar manner using a two gun spraying system producing a composite refractive index blend area. In this case the sprays are deposited on a flat surface of a casting element with flexural characteristics to the desired thickness, for example 0.35 mm thick. Once deposited the resins may be partially polymerized to a gel state. Following this stage the casting element is flexed so that its surface assumes a curvature corresponding to the Fresnel perform. Then the partially gelled polymer is pressed against the perform and polymerized to permanently bond the gelled layer to the Fresnel surface. Layer C incorporating the flexible casting element may remain as part of the lens, as shown in FIG. 18*a*, or be removed and reused or disposed of. The flexible casting element as stated may be relaxed to the desired curvature or by mechanical or other means, for example by a vacuum forming process, be caused to deform to the desired curvature.

Figure 19:
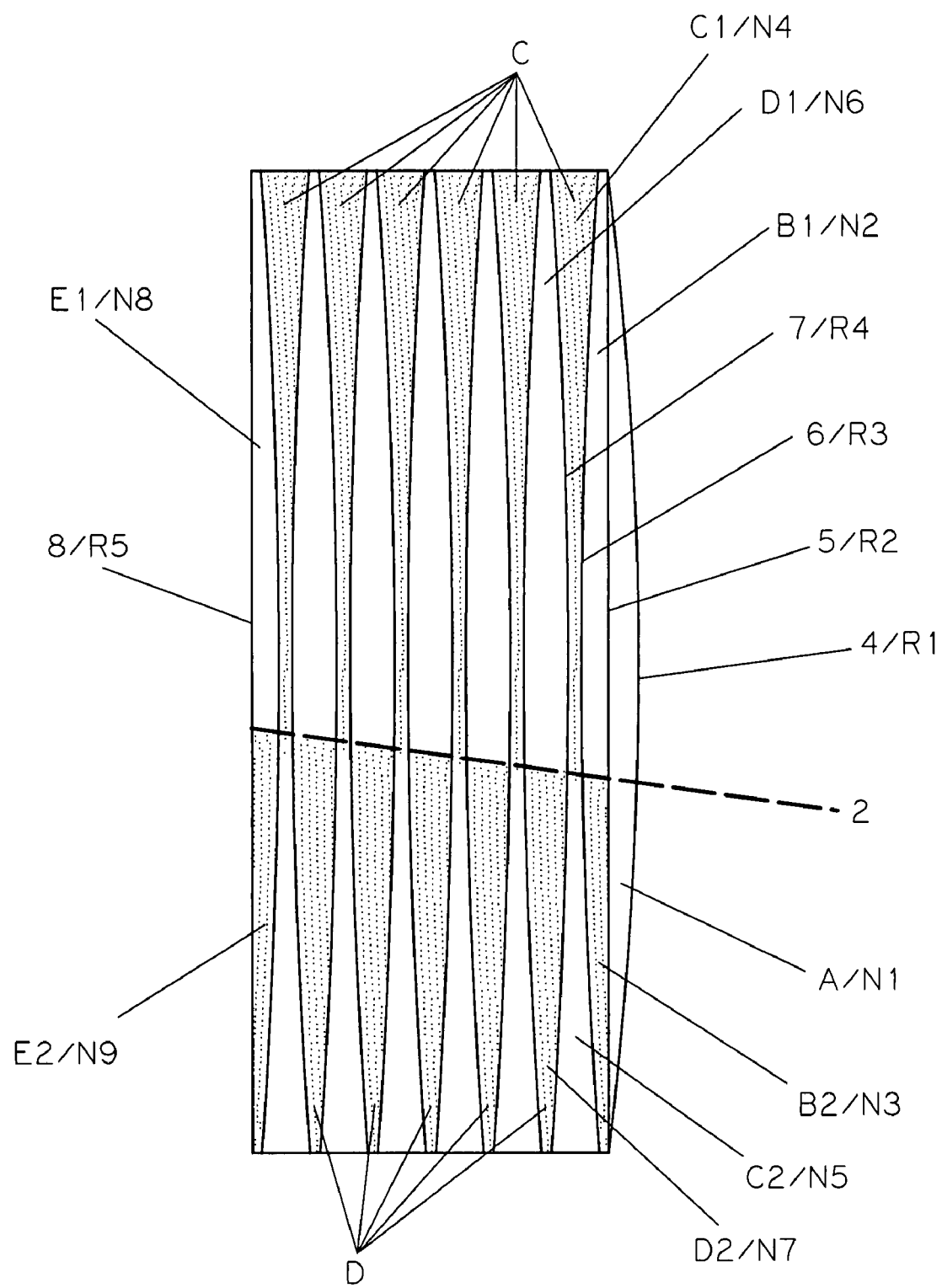
FIG. 19 is an illustrative side view of a 14 layer bifocal lens incorporating numerous changing refractive index layers.

Referring to FIG. 19 there is shown a 12th exemplary lens constructed following the teachings of this disclosure. The lens_ is a multifocal spectacle lens. It incorporates numerous layers with changing refractive index profiles and power signs each opposite that of the adjacent layer9s0. As already demonstrated, a pair of changing refractive index profiles may be used in adjacent plus power and minus power layers effectively to increase or double the refractive index difference, thereby providing a means of achieving high add values with lower or flatter curvatures and reducing lens thickness. The present embodiment works on the same principle but utilizes numerous paired layers of low curvature and thickness to achieve a similar result. Film layers 0.3 mm thick or less may be combined in various numbers to produce a corresponding add value. For example, if one pair of oppositely powered and oppositely index-profiled layers provides 0.417 diopters of add, 6 identical paired layers will provide 2.5 diopters of add. In FIG. 19, anterior lens section A has a generally constant refractive index and sections B, C, D and E have changing refractive indices. There are six C sections and five D sections. Sections B and E are equal in power and added together constitute an additional D section. Paired sections C and D are opposite and equal in power. Section A has plus power and compensates for a negative 'add' power of the upper distance vision portion of the lens, section B has plus power, sections C have minus power, sections D have plus power and section E has plus power. The refractive index of the distance vision portions of the C sections is greater than that of their near vision portions, and the refractive index of the distance vision portions of the D sections is less than that of their near vision portions, therefore providing complexed add power for near vision. Lens layer A is comprised of an optically transparent material whose refractive index N1 is generally constant. Lens layer B is comprised of an optically transparent material having two portions with different refractive index values. B1 corresponds to the distance vision portion of the lens and has a refractive index value N2 and B2 corresponds to the near vision portion of the lens and has a refractive index value N3. Lens layer C is comprised of an optically transparent material having two portions with different refractive index values. C1 corresponds to the distance vision portion of the lens and has a refractive index value N4 and C2 corresponds to the near vision portion of the lens and has a refractive index value N5. Lens layer D is comprised of an optically transparent material having two portions with different refractive index values. D1 corresponds to the distance vision portion of the lens and has a refractive index value N6 and D2 corresponds to the near vision portion of the lens and has a refractive index value N7. Lens layer E is comprised of an optically transparent material having two portions with different refractive index values. E1 corresponds to the distance vision portion of the lens and has a refractive index value N8 and E2 corresponds to the near vision portion of the lens and has a refractive index value N9. Dotted line 2 represents the refractive index blend interfaces of N2 and N3, N4 and N5, N6 and N7, and N8 and N9.

Anterior surface 4 of lens layer A has a convex curvature with a radius value R1, internal interface surface 5 has a radius R2, internal interface surfaces 6 have a radius R3, internal interface surfaces 7 have a radius R4, and posterior surface 8 has a radius R5.

Lens sections C and D share curved interfaces 6/R3 and 7/R4. R3 is concave and R4 is convex with respect to section A. Because adjacent internal interface surfaces are opposite in curvature the CREN value for a lens according to this embodiment may be calculated simply by adding the absolute surface diopter powers of all surfaces.

The refractive index orientation angle of 8° as shown is obtained by misaligning each successive refractive index blend an incremental amount.

As with the exemplary lenses, values for all the radii are based on the lens providing 0 power in the distance vision portion and 2.5 diopters of add power in the near vision portion of the lens.

Exemplary Values for the parameters of a bifocal lens according to this embodiment are as follows:

N1=1.74

N2=1.41

N3=1.74

N4=1.74

N5=1.41

N6=1.41

N7=1.74

N8=1.41

N9=1.74

R1=596.0

R2=plano

R3=−3208.41

R4=3208.41

R5=plano

CT=2.1

ET=1.575

CREN=5.418

OA=8°

The above-described lens may be produced by processing each lens layer independently of the others in a sequential order using for example the spraying method above-described with respect to the FIGS. 13, 15, 17 and 18 in conjunction with a deformable base with desirable flexural characteristics.

Figure 20:
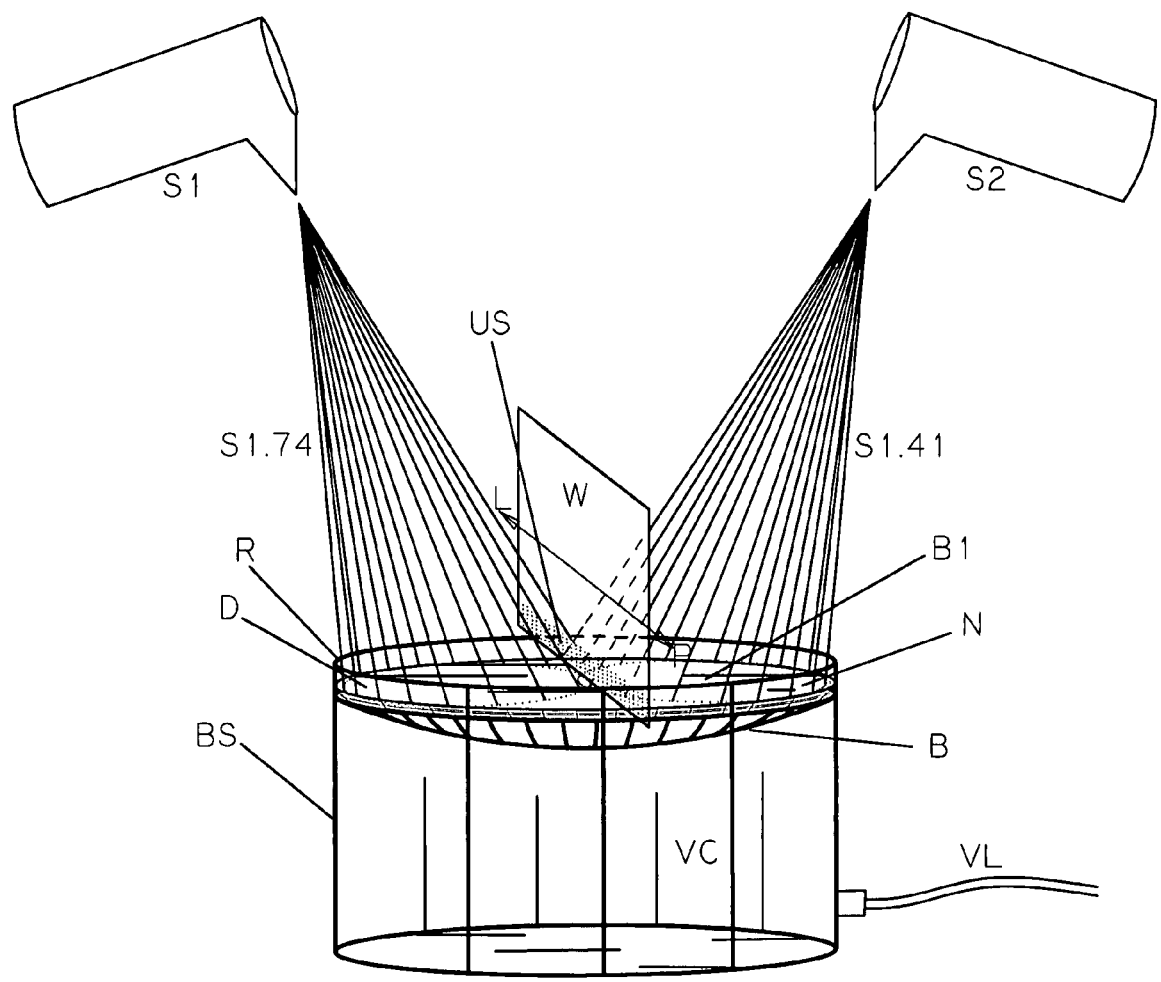
FIG. 20 illustrates an apparatus used to create a multifocal spectacle lens layer of changing refractive index by a spraying technique.

Referring now to FIG. 20 there is shown a spraying apparatus that may be used to process the lens layers. Two spray guns S1 and S2 deliver separately the 1.74 and the 1.41 refractive index materials respectively. The guns move together in a linear motion and path LP, each spraying resin deposits S1.41 and S1.74 onto base surface B and producing a combined overlapping or common deposit 0.3 to 2 mm wide. A thin vertical separator wall W positioned between the spray guns and oriented in line with the direction of their movement, just above the pooling resin deposits, divides the distance portion D and near vision portion N and blocks unwanted spray US from each gun from depositing in the adjacent portion while controlling an amount of each sprayed resin that passes underneath and beyond it to mix with the adjacent sprayed resin portion.

The extent of the common deposit or blend area may be increased or decreased and easily controlled by the height of the wall, the distance of the spray guns from the deposit, the direction of spray of the guns and the shape of the spray pattern. A wall height of 3 mm above the sprayed deposit may result in a blend area approximately 1 mm in width. As the deposit layers build up and increase in height, the wall may be raised or the lens lowered to maintain the proper distance from the uppermost deposit surface. The wall may include an opening along its lower extent connected to a vacuum source that draws accumulated resin build up away from the sprayed area and off the wall W in order to prevent dripping of material from the wall into the deposit. Flexible and deformable base B is the surface on which the first resin layer is sprayed, and above which is the vertical separator wall W. The deformable base B is mounted on base support cylinder BS, which has an upper wall portion R that extends above base B and which acts as a container for the sprayed resins. Deformable base B comprises a thin plastic, glass or stainless steel member that through mechanical or other means may be caused to change curvature. During each spray application a change of curvature is induced in base B, which in turn creates the curvature of each internal interface as a new layer is applied. In FIG. 20, vacuum line VL provides a partial and controllable vacuum from a vacuum source to vacuum chamber VC and provides suction means to draw deformable base B downward to create a concave curvature. In a following cycle line VL is pressurized to create an atmospheric or superatmospheric pressure environment in chamber VC and so provides pressure to push deformable base B upward to create a convex curvature. As R3 and R4 have a sagittal depth of 0.0974 mm over 50 mm, only a small amount of surface change is needed to cause base B to assume the needed radius of curvature. A variable thickness of base B may be used to insure that a surface of continuous and useful optical curvature, for example, a spherical curvature, is achieved when the base is deformed.

The first composite layer B1 is initially applied when the base B is maintained in a flat condition. During the course of spraying as the sprayed layer pools and builds up, base surface B may be progressively steepened in concavity to its final curvature, as indicated in the drawing, as the spray layer thickness is achieved, thus the change of curvature progresses in concert with the build up of the applied resin layer. Once the final curvature is induced and the resin layer thickness is achieved wall W may be removed. At this point the liquid surface of the sprayed resin layer will settle and self-level after which it can be photo polymerized to a gel state. Alternatively, a flat or slightly convex casting surface may be applied to the unpolymerized resin layer to precisely control the surface contour. A convex casting surface is used to avoid entrapment of air bubbles when applied to the air-exposed surface of the sprayed resin composition. The resin layer may then be gel polymerized and afterward the upper casting surface removed. The top most surface of the gel cured deposit becomes the base B1 on which the second sprayed layer is applied, therefore any minor adjustments in curvature needed may be made to base B to provide a flat surface B1 on which to apply the second layer. A second sprayed resin layer may then be applied to the flat surface although this time with the spray guns or lens rotated 180° to achieve an opposite refractive index profile orientation. During the course of spraying the second layer, base surface B may be progressively reduced in concave steepness and gradually be made convex to its final steepness as the spray layer thickness is achieved, thus again the change of curvature progresses in concert with the build up of the applied resin layer, creating each new curved interface radius with a corresponding change of curvature of base B. Once the final curvature is induced and the resin layer thickness is achieved, the top surface of the sprayed liquid resin may be finished as previously described. The spray guns or lens may be repeatedly rotated 180° to achieve an opposite refractive index profile orientation for each additional layer having corresponding alternating plus or minus power. Each rotation may also include an incremental offset to achieve the refractive index orientation angle 2. It should be noted that after each resin layer is spray deposited and just prior to its gel polymerization, the induced curvature of the prior layer will require a radius of curvature which, once the lens is fully polymerized, becomes alternately the R3 and R4 curvatures. This will require compensatory curvatures to be induced at the gel polymerization stage with minor adjustments made due to lens thickness increase as the layering process ensues. The final polymerization from gel to solid should be undertaken with the base material surface and top surface in a flat state. The final layer A may be produced as a preform and bonded to the composite multi-layered lens, or it may be cast onto surface B or E and polymerized.

As an alternative to the diffusion processes earlier described in relation to the first through seventh exemplary lenses, the above-described spraying technique may also be used. As the thickness of the changing refractive index section or sections of these lenses will be greater than that of the twelfth exemplary lens, on the order of 1 mm or greater, a greater sprayed thickness deposit will be required. If the density of the two refractive index materials sprayed is substantially different, the heavier material may settle beneath the lighter material by the pull of gravity if single spray applications of great thickness are applied. To avoid this problem periodic gel polymerization or partial curing of thin applied layers may be undertaken. For example, applied layers 0.25 mm thick may be sequentially gel polymerized until the final layer thickness is achieved. In this case an upper casting surface need not be applied to each of the sequential spray deposits to create a perfectly flat surface as additional spray coatings of the same refractive index profile orientation will be applied. These lenses of greater thickness and steeper curvature may also utilize a deformable base to facilitate the spray production process and to provide the required radius. As previously described, a removable casting surface may be applied to the upper most surface followed by final polymerization and subsequent removal. Alternatively the casting surface may comprise an additional permanently bonded lens section serving as a protective layer.

What is claimed is:

1. A multifocal ophthalmic lens for use by a patient, said lens formed of at least two layers, one having a positive power and the other having a negative power, one of the two layers being a first layer and having two adjacent portions, one portion with a first, substantially constant refractive index and the other portion with a second, substantially constant refractive index, and a blended region extending transverse to a meridian of the lens and forming a transition between the adjacent portions with a refractive index that varies continuously between the first and second refractive indices, the transition having a width selected to be too narrow to provide a useful zone of vision.

2. The lens of claim 1, the two layers each having surfaces of continuous curvature.

3. The lens of claim 1, the other of said two layers being a second layer and being shaped to provide, in combination with the first layer, a vision-correcting prescription.

4. The lens of claim 3 wherein one portion corresponds to a first zone of vision of the patient and the other portion corresponds to a second zone of vision of the patient, the zones of vision being selected from a group consisting of a distance vision zone, an intermediate vision zone and a near vision zone.

5. The lens of claim 1, wherein the two layers comprise Fresnel lenses and wherein the interface of the two layers comprises the Fresnel surfaces.

6. The lens of claim 5 wherein the Fresnel surfaces have non-optically functional steps at least some of which are conical and wherein the apices of the conic steps are located posterior of the posterior surface of the lens thereby providing increased light transmission from peripheral field points through the lens to the patient's eye.

7. The lens of claim 6 wherein the apices of the conic steps are 16-28.5 mm behind the posterior surface of the lens.

8. The lens of claim 5 wherein the other of said two layers being a second layer and the second layer has a substantially constant index of refraction which is substantially the same as the index of refraction of the one portion of the first layer.

9. The lens of claim 1 wherein the second layer includes two adjacent portions, one portion with a first, substantially constant refractive index and the other portion with a second, substantially constant refractive index, and a blended region extending transverse to said meridian forming a transition between the adjacent portions with a refractive index that varies continuously between the first and second refractive indices, the transition having a width selected to be too narrow to provide a useful zone of vision, and wherein the first and second layers are oriented with respect to each other in a positional relationship selected from the group consisting of a) having at least part of the portion of the first layer having a lower refractive index aligned along a line of sight of the patient with at least part of the portion of the second layer having a higher refractive index and b) having at least part of the portion of the first layer having a higher refractive index aligned along a line of sight of the patient with at least part of the portion of the second layer having a lower refractive index.

10. The lens of claim 9 including a third layer, the third layer being shaped to provide, in combination with the first and second layers, a vision-correcting prescription.

11. The lens of claim 1 wherein the first layer has an anterior surface and a posterior surface each generally transverse to a line of sight of the patient through the lens, the transition having an extent between the anterior and posterior surfaces wherein through said extent is defined a surface that has a substantially constant index of refraction at least a portion of which is generally aligned with the line of sight of the patient through the lens.

12. The lens of claim 11 wherein the transition of the first layer has a positional relationship with the transition of the second layer selected from the group consisting of a) being substantially aligned along a line of sight through the lens so as to form a first alignment of portions comprising the first layer's lower refractive index portion and the second layer's higher refractive index portion and a second alignment of portions comprising the first layer's higher refractive index portion and the second layer's lower refractive index portion and b) being offset so as to form a first partial alignment of portions comprising the first layer's lower refractive index portion and the second layer's higher refractive index portion, a second partial alignment of portions comprising the first layer's higher refractive index portion and the second layer's lower refractive index portion and a third partial alignment of portions between the transitions of the first and second layers comprising portions selected from the group consisting of a) the first layer's lower refractive index portion and the second layer's lower refractive index portion and b) the first layer's higher refractive index portion and the second layer's higher refractive index portion.

13. The lens of claim 12 wherein said at least two layers each have anterior and posterior surfaces each generally transverse to a line of sight of the patient through the lens, the transition having an extent between the anterior and posterior surfaces wherein through said extent is defined a surface that has a substantially constant index of refraction at least a portion of which is generally aligned with the line of sight of the patient through the lens.

* * * * *